US012167361B2

(12) United States Patent
Shrestha et al.

(10) Patent No.: US 12,167,361 B2
(45) Date of Patent: Dec. 10, 2024

(54) SUPPORT OF FIXED CELLS FOR USER EQUIPMENT ACCESS TO A NON-TERRESTRIAL NETWORK

(71) Applicant: QUALCOMM Incorporated, San Diego, CA (US)

(72) Inventors: Bharat Shrestha, San Diego, CA (US); Stephen William Edge, Escondido, CA (US); Luis Fernando Brisson Lopes, Swindon (GB); Amer Catovic, San Diego, CA (US); Umesh Phuyal, San Diego, CA (US); Alberto Rico Alvarino, San Diego, CA (US); Haris Zisimopoulos, London (GB); Stefano Faccin, San Ysidro, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/090,876

(22) Filed: Nov. 5, 2020

(65) Prior Publication Data

US 2021/0144670 A1    May 13, 2021

Related U.S. Application Data

(60) Provisional application No. 63/061,711, filed on Aug. 5, 2020, provisional application No. 63/028,539, filed
(Continued)

(51) Int. Cl.
*H04W 64/00* (2009.01)
*H04W 24/10* (2009.01)

(52) U.S. Cl.
CPC ........... *H04W 64/00* (2013.01); *H04W 24/10* (2013.01)

(58) Field of Classification Search
CPC ....... H04B 7/185; H04B 7/204; H04W 64/00; H04W 4/02; H04W 24/10
See application file for complete search history.

(56) References Cited

U.S. PATENT DOCUMENTS 10,985,835 B2   4/2021   Zheng et al.
11,284,310 B2   3/2022   Shan
(Continued)

FOREIGN PATENT DOCUMENTS

CA   2813271 A1 * 5/2012 ............. G06F 21/44
CN   1377465 A   10/2002
(Continued)

OTHER PUBLICATIONS

Huawei ("Support of location reporting function in NG-RAN", 3GPP Draft; R3-182029, 3rd Generation Partnership Project (8GPP), Mobile Competence Centr 650, Route Des Lucioles ;F-06921 Sophia-Antipolis Cedex ; France, vol. RAN WG3, No. Sanya, China; Apr. 16-Apr. 20, 2018 Apr. 15, 2018 (Apr. 15, 2018), (Year: 2018).*

(Continued)

*Primary Examiner* — Umair Ahsan
(74) *Attorney, Agent, or Firm* — QUALCOMM Incorporated

(57) ABSTRACT

Disclosed are techniques for wireless communication using satellite access to a wireless network, where a wireless cell supported by a satellite is moving or temporarily fixed. In an aspect, a radio access network (RAN) entity or a user equipment (UE) provides, to a core network entity, an enhanced cell global identifier (CGI), where the enhanced CGI includes at least one field representing a location of the UE. Based on the enhanced CGI, the core network entity determines a location of the UE, and may provide a service to the UE based on the location. A core network may also
(Continued)

provide an enhanced CGI to a RAN, e.g., to support wireless emergency alerting to UEs.

9 Claims, 13 Drawing Sheets

Related U.S. Application Data on May 21, 2020, provisional application No. 63/010,564, filed on Apr. 15, 2020, provisional application No. 62/989,572, filed on Mar. 13, 2020, provisional application No. 62/932,486, filed on Nov. 7, 2019.

(56) References Cited

U.S. PATENT DOCUMENTS

| | | | |
|---|---|---|---|
| 11,296,782 B2 | 4/2022 | Edge | |
| 11,297,519 B2 | 4/2022 | Kubota et al. | |
| 11,303,352 B2 | 4/2022 | Ravishankar et al. | |
| 11,303,353 B2 | 4/2022 | Edge | |
| 2008/0102896 A1 | 5/2008 | Wang et al. | |
| 2009/0016274 A1 | 1/2009 | Nylander et al. | |
| 2012/0002646 A1* | 1/2012 | Zabawskyj | H04L 12/66 370/328 |
| 2015/0341846 A1 | 11/2015 | Shi et al. | |
| 2016/0128020 A1 | 5/2016 | Agarwal et al. | |
| 2017/0353827 A1 | 12/2017 | D'Alberto et al. | |
| 2018/0241464 A1 | 8/2018 | Michaels | |
| 2018/0376443 A1 | 12/2018 | Maksimov et al. | |
| 2018/0376452 A1 | 12/2018 | Wei et al. | |
| 2019/0090289 A1 | 3/2019 | Huang-Fu et al. | |
| 2019/0182897 A1 | 6/2019 | Jain et al. | |
| 2019/0207676 A1 | 7/2019 | Noerpel et al. | |
| 2019/0246260 A1 | 8/2019 | Edge et al. | |
| 2019/0335517 A1* | 10/2019 | Reial | H04W 76/11 |
| 2020/0077358 A1 | 3/2020 | Kovacs et al. | |
| 2020/0236731 A1 | 7/2020 | Jung et al. | |
| 2021/0068065 A1 | 3/2021 | Wigard et al. | |
| 2021/0092640 A1 | 3/2021 | Ravishankar | |
| 2021/0105693 A1 | 4/2021 | Tripathi et al. | |
| 2021/0136666 A1 | 5/2021 | Srivastava et al. | |
| 2021/0143897 A1 | 5/2021 | Edge | |
| 2021/0144539 A1 | 5/2021 | Edge | |
| 2021/0144669 A1 | 5/2021 | Edge | |
| 2021/0211191 A1 | 7/2021 | Zheng et al. | |
| 2021/0212014 A1 | 7/2021 | Gao et al. | |
| 2021/0218467 A1 | 7/2021 | Jin et al. | |
| 2021/0242933 A1 | 8/2021 | Edge | |
| 2021/0250781 A1 | 8/2021 | Dang et al. | |
| 2021/0289339 A1 | 9/2021 | Yu et al. | |
| 2021/0314060 A1 | 10/2021 | Shi et al. | |
| 2021/0385675 A1 | 12/2021 | Määttänen et al. | |
| 2021/0399797 A1* | 12/2021 | Khan | H04B 7/18541 |
| 2022/0007267 A1 | 1/2022 | Maattanen et al. | |
| 2022/0007328 A1 | 1/2022 | Sun | |
| 2022/0022155 A1 | 1/2022 | Wang et al. | |
| 2022/0078746 A1 | 3/2022 | Lee et al. | |
| 2022/0086671 A1 | 3/2022 | Hong | |
| 2022/0086713 A1 | 3/2022 | Maattanen et al. | |
| 2022/0095260 A1 | 3/2022 | Shan | |
| 2022/0132453 A1 | 4/2022 | Wei et al. | |
| 2022/0217561 A1 | 7/2022 | Geng et al. | |
| 2022/0225208 A1 | 7/2022 | Wang et al. | |
| 2023/0370157 A1 | 11/2023 | Edge | |

FOREIGN PATENT DOCUMENTS

| | | | |
|---|---|---|---|
| CN | 103222228 A | 7/2013 | |
| CN | 103987058 A | 8/2014 | |
| CN | 104904260 A | 9/2015 | |
| CN | 105432130 A | 3/2016 | |
| CN | 106031211 A | 10/2016 | |
| CN | 106569229 A | 4/2017 | |
| CN | 107404715 A | 11/2017 | |
| CN | 108307681 A | 7/2018 | |
| CN | 114631273 | 6/2022 | |
| EP | 1987691 A1 | 11/2008 | |
| EP | 2014111 A2 | 1/2009 | |
| EP | 1987691 B1 * | 7/2009 | H04W 4/90 |
| EP | 2603998 A2 | 6/2013 | |
| EP | 2966903 A1 * | 1/2016 | H04W 24/10 |
| WO | 0021216 A2 | 4/2000 | |
| WO | 0180578 A1 | 10/2001 | |
| WO | 2008054668 A2 | 5/2008 | |
| WO | 2012171128 A1 | 12/2012 | |
| WO | 2016101563 A1 | 6/2016 | |
| WO | 2018009362 A2 | 1/2018 | |
| WO | 2019080056 A1 | 5/2019 | |
| WO | 2021092390 A1 | 5/2021 | |

OTHER PUBLICATIONS

Huawei: "Support of Location Reporting Function in NG-RAN", 3GPP Draft, 3GPP TSG-RAN3 Meeting #99bis, R3-182029, 3rd Generation Partnership Project (3GPP), Mobile Competence Centre, 650, Route Des Lucioles, F-06921 Sophia-Antipolis Cedex, France, vol. RAN WG3. No. Sanya, China, Apr. 16-Apr. 20, 2018, Apr. 15, 2018 (Apr. 15, 2018), XP051430187, 4 Pages, Retrieved from the Internet: URL: http://www.3gpp.org/ftp/Meetings%5F3GPP%5FSYNC/RAN3/Docs/ [retrieved on Apr. 15, 2018] Proposal 4.

International Search Report and Written Opinion—PCT/US2020/059423—ISA/EPO—Feb. 26, 2021.

Sakshi, P., et al., "A Survey on Energy Efficient Narrowband Internet of Things (NBIoT): Architecture, Application and Challenges", IEEE Access, vol. 7, 2018, (Current Version Feb. 14, 2019) pp. 16739-16776.

Thales., et al., "NR-NTN: TP for Chap 7.3 NR Modifications to Support NTN", 3GPP TSG RAN Meeting #80, RP-180658, La Jolla, USA, Jun. 11-Jun. 14, 2018, 37 Pages.

"3rd Generation Partnership Project; Technical Specification Group Radio Access Network;Solutions for NR to Support Non-Terrestrial Networks (NTN) (Release 16)", 3GPP Standard; Technical Report; 3GPP TR 38.821, 3rd Generation Partnership Project (3GPP), Mobile Competence Centre ; 650, Route Des Lucioles; F-06921 Sophia-Antipolis Cedex; France, No. V0.4.0, Apr. 11, 2019 (Apr. 11, 2019), pp. 1-46, XP051723405, [retrieved on Apr. 11, 2019], Paragraph [04.2], Paragraph [08.1], Paragraph [08.3].

Hughes: "NR-NTN: Paging in NGSO Satellite Systems", 3GPP TSG RAN WG3 Meeting #101, 3GPP Draft, R3-184403, 3rd Generation Partnership Project (3GPP), Mobile Competence Centre, 650, Route Des Lucioes, F-06921 Sophia-Antipolis Cedex, France, vol. RAN WG3, No. Gothernburg, Sweden; Aug. 20-Aug. 24, 2018, Aug. 10, 2018 (Aug. 10, 2018), 5 Pages, XP051527768, Retrieved from the Internet: URL: http://www.3gpp.org/ftp/tsg%5Fran/WG3%5Flu/TSGR3%5F101/Docs/R3%2D184403%2Ezip [retrieved on Aug. 10, 2018] Chapters 2, 3, the whole doc.

LG Electronics Inc: "Considerations on Fixed on Earth Tracking Area Management in NTN", 3GPP Draft, WG2 Meeting #105, 3GPP Draft; R2-1905122 Considerations on Fixed on Earth Tracking Area Management in NTN, 3rd Generation Partnership Project (3GPP), Mobile Competence Centre; 650, Route Des Lucioles; F-06921 Sophia-, vol. RAN WG2, No. Xi'an, China; Apr. 8-Apr. 12 2019 Apr. 6, 2019 (Apr. 6, 2019), 3 Pages, XP051702398, Retrieved from the Internet: URL: http://www.3gpp.org/ftp/Meetings%5F3GPP%5FSYNC/RAN2/Docs/R2%2D1905122%Ezip [Apr. 6, 2019]Whole Doc.

LG Electronics Inc: "Report on Email Discussion [107#64] [NTN] Cell Selection & Reselection", 3GPP TSG-RAN WG2Meeting #107bis, 3GPP Draft; R2-1914070 Report of Email Discussion [107#64][NTN] Cell Selection&Reselection, 3rd Generation Partnership Project (3GPP), Mobile Competence Centre; 650, Route Des Lucioles; F-06921 Soph, vol. RAN WG2, No. Chongqing, China; Oct. 14-Oct. 18, 2019, Oct. 18, 2019 (Oct. 18, 2019), 22 Pages, XP051797900, Retrieved from the Internet: URL: http://ftp.3gpp.org/tsg_ran/WG2_RL2/TSGR2_107bis/Docs/R2-1914070.

(56) References Cited

OTHER PUBLICATIONS zip R2-1914070 Report email disc[107#64] [NTN]Cell select &reselect.doc [retrieved Oct. 18, 2019] ZTE Contribution"Approach 2" p. 17.

Nokia., et al., "Analysis on Tracking Area Design," 3GPP Draft, 3GPP TSG-WG3 Meeting #104, R3-193191_WAS_R3-192802 TA REVTHALES2, 3rd Generation Partnership Project (3GPP), Mobile Competence Centre, 650, Route Des Lucioles, F-06921, Sophia-Antipolis Cedex, France, vol. RAN WG3, No. Reno, NV, USA; May 13-May 17, 2019, May 21, 2019 (May 21, 2019), XP051740754, 5 pages ,Retrieved from the Internet: URL: http://www.3gpp.org/ftp/tsg%5Fran/WG3%5Flu/TSGR3%5F104/Docs/R3%2D193191%2Ezip [retrieved on May 21, 2019] the whole doc.

Nomor Research GMBH., et al., "Multiple PLMN Identities in NTN", 3GPP Draft, 3GPP TSG-RAN WG2 Meeting #107-Bis, R2-1912696_MULTIPLE_PLMN_NTN 3rd Generation Partnership Project (3GPP), Mobile Competence Centre, 650, Route Des Lucioles, F-06921, Sophia-Antipolis Cedex, France, vol. RAN WG2, No. Chongqing, China; Oct. 14-Oct. 18, 2019, Oct. 2, 2019 (Oct. 2, 2019), XP051803661, 6 pages, Retrieved from the Internet: URL: https://ftp.3gpp.org/tsg_ran/WG2_RL2/TSGR2_107bis/Docs/R2-1912696.zip R2-1912696 Multiple PLMN NTN.docx [retrieved Oct. 2, 2019T whole doc.

Nomor Research GMBH., et al., "UE Positioning Information for NTN Mobility", 3GPP Draft, 3GPP TSG RAN WG2 Meeting #105bis, R2-1904407_NTN_MobilityEnhancements, 3rd Generation Partnership (3GPP), Mobile Competence Centre, 650, Route Des Lucioles, F-06921 Sophia-Antipolis Cedex, France, vol. RAN WG2, No. Xi'an, China, Apr. 8-Apr. 12, 2019, Apr. 6, 2019 (Apr. 6, 2019), XP051701709, 4 Pages, Retrieved from the Internet: URL:http://www.3gpp.org/ftp/Meetings%5F3GPP%5FSYNC/RAN2/Docs/R2%2D1904407%2Ezip, [retrieved on Apr. 6, 2019] Whole doc.

Qualcomm Incorporated: "Virtual Cell Solution for Mobility and Regulatory Support for Satellite Access in 5G", 3GPP Draft, SA WG2 Meeting #136, S2-1911058, 3rd Generation Partnership Project (3GPP), Mobile Competence Centre, 650, Route Des Lucioles, F-06921, Sophia-Antipolis Cedex, France, vol. SA WG2, No. Reno, Nevada, USA, Nov. 18-Nov. 22, 2019, Nov. 8, 2019 (Nov. 8, 2019), 9 Pages, XP051821168, Retrieved from the Internet: URL: https://ftp.3gpp.org/tsg_sa/WG2_Arch/TSGS2_136_Reno/Docs/S2-1911858.zip S2-1911058-TR 23.737-Virtual Cell solution.doc[retrieved on Nov. 8, 2019] whole doc.

Thales: "NTN TR 38.821 Chap 8 Corrections", 3GPP TSG RAN WG3 Meeting #104, 3GPP Draft; R3-192760 NTN TR 38.821 CHAP 8 Corrections V2, 3rd Generation Partnership Project (3GPP), Mobile Competence Centre; 650, Route Des Lucioles; F-06921 Sophia-Antipolis Cedex; France, vol. RAN WG3, No. Reno; May 13-May 17, 2019, May 3, 2019 (May 3, 2019), 26 Pages, XP051712953, Retrieved from the Internet: URL: http://www.3gpp.org/ftp/tsg%5Fran/WG3%5Flu/TSGR3%5F104/Docs/R3%2D192760%2Ezip [retrieved on May 3, 2019] paragraph [08.3].

ZTE., et al., "Tracking Area Management and Paging Handling in NTN", 3GPP Draft, R3-190139, 3GPP TSG RAN WG3#103, Tracking Area Management and Paging Handling in NTN V5, 3rd Generation Partnership Project (3GPP), Mobile Competence Centre, 650, Route Des Lucioles, F-06921 Sophia-Antipolis C, vol. RAN WG3, No. Athens, Greece; Feb. 25-Mar. 1, 2019, Feb. 16, 2019 (Feb. 16, 2019), 13 Pages, XP051604086, Retrieved from the Internet: URL: http://www.3gpp.org/ftp/tsg%5Fran/WG3%5Flu/TSGR3%5F103/Docs/R3%2D190139%2Ezip [retrieved on Feb. 16, 2019]title, Chaps 1,2,8.3,whole doc.

Lin X., et al., "5G New Radio Evolution Meets Satellite Communications: Opportunities, Challenges, and Solutions", arxiv.org, Cornell University Library, 201 Olin Library Cornell University Ithaca, NY14853, Mar. 27, 2019 (Mar. 27, 2019), XP081158513, pp. 1-8, Sections V-B and VI.

3GPP TR 23.737: "3rd Generation Partnership Project, Technical Specification Group Services and System Aspects, Study on Architecture Aspects for Using Satellite Access in 5G (Release 16)", 3GPP TR 23.737, V1.1.0, Oct. 2019, pp. 1-65.

HUAWEI: "Support Of Location Reporting Function in NG-RAN", 3GPP TSG-RAN3 Meeting #99bis, R3-182029, Sanya, China, Apr. 16-20, 2018, Apr. 7, 2018, 4 Pages.

\* cited by examiner

SUPPORT OF FIXED CELLS FOR USER EQUIPMENT ACCESS TO A NON-TERRESTRIAL NETWORK

CROSS-REFERENCE TO RELATED APPLICATIONS

This application claims under 35 U.S.C. § 119 the benefit of and priority to U.S. Provisional Application No. 62/932,486, entitled "SYSTEMS AND METHODS FOR SUPPORT OF A 5G SATELLITE RADIO ACCESS TECHNOLOGY," filed Nov. 7, 2019, U.S. Provisional Application No. 62/989,572, entitled "METHODS PERFORMED IN USER EQUIPMENT, SATELLITE VEHICLES, OR EARTH STATIONS FOR ENABLING THIRD GENERATION PARTNERSHIP PROJECT (3GPP) PROTOCOL COMMUNICATIONS, VIA SATELLITE RELAY," filed Mar. 13, 2020, U.S. Provisional Application No. 63/010,564, entitled "SYSTEMS AND METHODS FOR: SUPPORTING FIXED TRACKING AREAS AND FIXED CELLS FOR MOBILE SATELLITE WIRELESS ACCESS; HANDOVER OF MOBILE DEVICES, RADIO CELLS AND SPACE VEHICLES FOR MOBILE SATELLITE WIRELESS ACCESS; SUPPORTING SATELLITE ACCESS FROM MOBILE DEVICES TO PUBLIC LAND MOBILE NETWORKS; ASSISTING RADIO CELL ACQUISITION BY A MOBILE DEVICE FOR SATELLITE WIRELESS ACCESS," filed Apr. 15, 2020, U.S. Provisional Application No. 63/028,539, entitled "SYSTEMS AND METHODS FOR: SUPPORTING FIXED TRACKING AREAS AND FIXED CELLS FOR MOBILE SATELLITE WIRELESS ACCESS; HANDOVER OF MOBILE DEVICES, RADIO CELLS AND SPACE VEHICLES FOR MOBILE SATELLITE WIRELESS ACCESS; SUPPORTING SATELLITE ACCESS FROM MOBILE DEVICES TO PUBLIC LAND MOBILE NETWORKS; ASSISTING RADIO CELL ACQUISITION BY A MOBILE DEVICE FOR SATELLITE WIRELESS ACCESS," filed May 21, 2020, and U.S. Provisional Application No. 63/061,711, entitled "FIXED CELL IDENTITY FOR USER EQUIPMENT LOCATION IN NON-TERRESTRIAL NETWORKS," filed Aug. 5, 2020, all of which are assigned to the assignee hereof, and expressly incorporated herein by reference in their entireties.

BACKGROUND OF THE DISCLOSURE

1. Field of the Disclosure

Aspects of the disclosure relate generally to wireless communications, and more particularly, to accessing a wireless network using communication satellites.

2. Description of the Related Art

Wireless communications systems are widely deployed to provide various types of communication content, such as voice, video, packet data, messaging, broadcast, and so on. These systems may be capable of supporting communication with multiple users by sharing the available system resources (for example, time, frequency, and power). Examples of such multiple-access systems include fourth generation (4G) systems, such as Long Term Evolution (LTE) systems, LTE-Advanced (LTE-A) systems, or LTE-A Pro systems, and fifth generation (5G) systems which may be referred to as New Radio (NR) systems. These systems may employ technologies, such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to combine satellite-based communication systems with terrestrial wireless communications systems, such as 5G New Radio (NR) networks. In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network either directly or via a base station. A 5G network could treat the satellite system as another type of Radio Access Technology (RAT) distinct from, but also similar to, terrestrial 5G NR.

Since satellites typically differ from terrestrial base stations in terms of the size of their coverage areas, movement of coverage areas, longer propagation delays and different carrier frequencies, a 5G satellite RAT may need different implementation and support than a 5G terrestrial RAT for providing common services to end users. It may then be preferable to both optimize, and to minimize the impact for, such different implementation and support

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a radio access network (RAN) entity includes determining to send a location of a user equipment (UE) to a network entity; and reporting, to the network entity, an enhanced cell global identifier (CGI), the enhanced CGI including at least one field representing the location of the UE.

In an aspect, a method of wireless communication performed by a network entity includes receiving, from a RAN entity, an enhanced CGI, the enhanced CGI including at least one field representing a location of the UE; and determining the location of the UE from the enhanced CGI.

In an aspect, a RAN entity includes a memory; at least one network interface; and at least one processor communicatively coupled to the memory and the at least one network interface, the at least one processor configured to: determine to send a location of a UE to a network entity; and report, to the network entity, an enhanced CGI, the enhanced CGI including at least one field representing the location of the UE.

In an aspect, a network entity includes a memory; at least one network interface; and at least one processor communicatively coupled to the memory and the at least one network interface, the at least one processor configured to:

receive, from a RAN entity, an enhanced CGI, the enhanced CGI including at least one field representing a location of a UE; and determine the location of the UE based on the enhanced CGI.

In an aspect, a RAN entity includes means for determining to send a location of a UE to a network entity; and means for reporting, to the network entity, an enhanced CGI, the enhanced CGI including at least one field representing the location of the UE.

In an aspect, a network entity includes means for receiving, from a RAN entity, an enhanced CGI, the enhanced CGI including at least one field representing a location of a UE; and means for determining the location of the UE based on the enhanced CGI.

In an aspect, a non-transitory computer-readable medium storing computer-executable instruction includes computer-executable instructions comprising at least one instruction instructing a RAN entity to determine to send a location of a UE to a network entity; and at least one instruction instructing the RAN entity to report, to the network entity, an enhanced CGI, the enhanced CGI including at least one field representing the location of the UE.

In an aspect, a non-transitory computer-readable medium storing computer-executable instruction includes computer-executable instructions comprising at least one instruction instructing a network entity to receive, from a RAN entity, an enhanced CGI, the enhanced CGI including at least one field representing a location of a UE; and at least one instruction instructing the network entity to determine the location of the UE based on the enhanced CGI.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
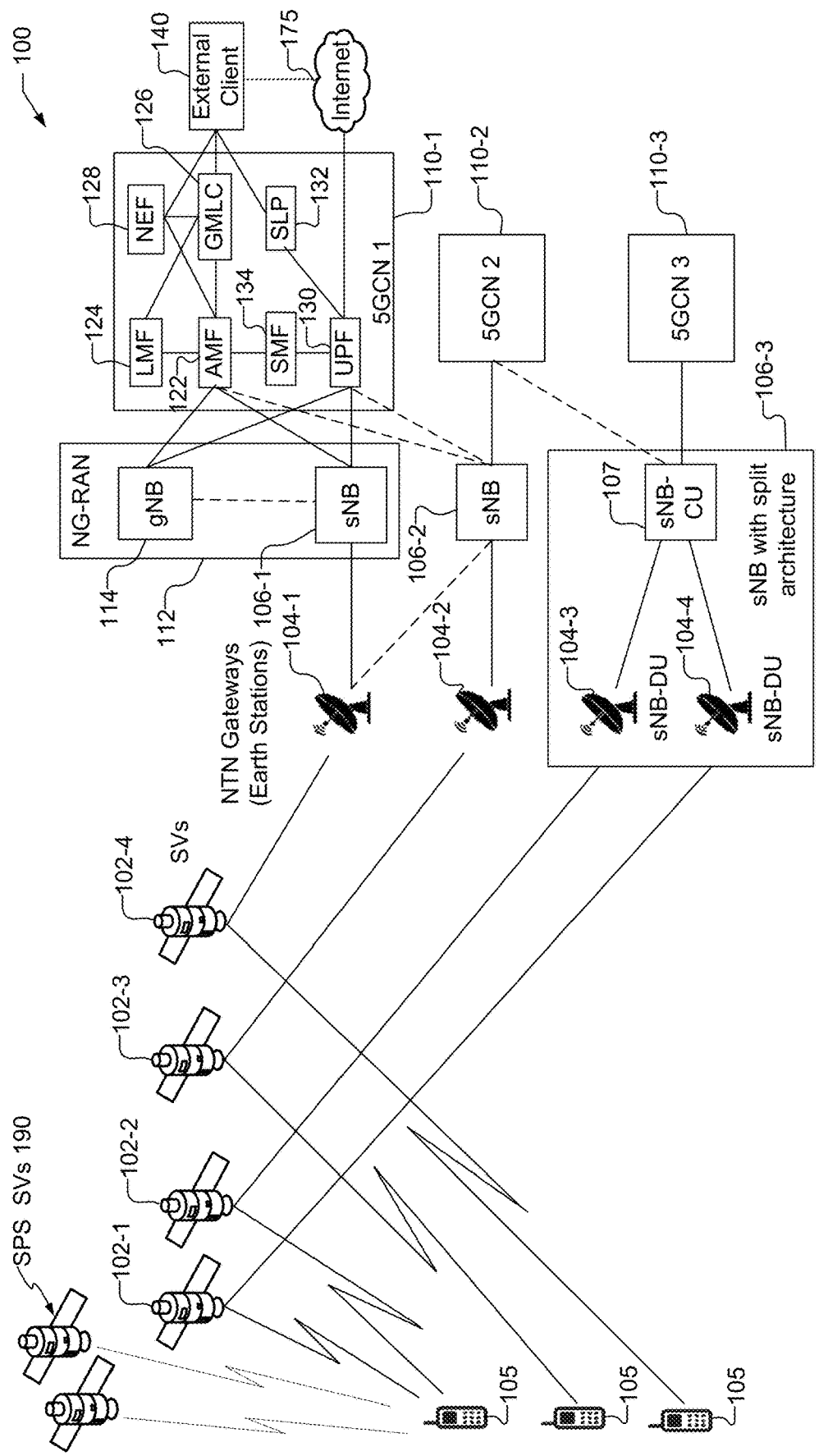
FIG. 1 is a diagram of a communication system with a network architecture having transparent space vehicles (SVs) that is capable of supporting satellite access to a wireless network.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) specification 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Satellites, also referred to as space vehicles (SVs), may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The ES in turn would connect to an element in a 5G Network, such as a modified base station (without a terrestrial antenna) or a network node in a 5G Core Network (5GCN). This element would in turn provide access to other elements in the 5G Network and ultimately to entities external to the 5G Network, such as Internet web servers and other user devices.

A rationale for 5G (or other cellular network) satellite access for UEs may include ubiquitous outdoor coverage for both users and Mobile Network Operators (MNs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g., a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas.

The use of 5G satellite access may provide other benefits. For example, 5G satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, 5G satellite access may be used to overcome internet blockage, e.g., in certain countries. Additionally, 5G satellite access may provide diversification to Space Vehicle Operators (SVOs). For example, 5G NR satellite access could provide another revenue stream to SVOs who would otherwise provide fixed Internet access.

FIG. 1 is a diagram of a communication system 100 capable of supporting satellite access using 5G New Radio (NR) or some other wireless access type, such as Code Division Multiple Access (CDMA), according to an aspect. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an ES without demodulating or decoding the signals. Similarly, a transparent SV may receive an UL signal from an ES and redirect the signal DL to served UEs without demodulating or decoding the signal. However, the SV may frequency convert received signals and may amplify and/or filter received signals before transmitting the signals.

The communication system 100 comprises a number of UEs 105, a number of SVs 102-1 to 102-4 (collectively referred to herein as SVs 102), a number of Non-Terrestrial Network (NTN) gateways 104-1 to 104-4 (collectively referred to herein as NTN gateways 104) (sometimes referred to herein simply as gateways 104, earth stations 104, or ground stations 104), a number of gNBs capable of communication with UEs via SVs 102 referred to herein as satellite NodeBs (sNBs) 106-1 to 106-3 (collectively referred to herein as sNBs 106). It is noted that the term sNB refers in general to an enhanced gNB with support for SVs and may be referred to as a gNB (e.g., in 3GPP). The communication system 100 is illustrated as further including components of a number of Fifth Generation (5G) networks including 5G Core Networks (5GCNs) 110-1 to 110-3 (collectively referred to herein as 5GCNs 110). The 5GCNs 110 may be public land mobile networks (PLMN) that may be located in the same or in different countries. FIG. 1 illustrates various components within 5GCN1 110-1 and a Next Generation (NG) Radio Access Network (RAN) (NG-RAN) 112 that may operate with 5GCN1 110-1. It should be understood that 5GCN2 110-2 and 5GCN3 110-3 may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC).

The communication system 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the communication system 100 are described below. The communication system 100 may include additional or alternative components Permitted connections in the communication system 100 having the network architecture with transparent SVs illustrated in FIG. 1, allow an sNB 106 to access multiple Earth stations 104 and/or multiple SVs 102. One sNB 106 may also be shared by multiple PLMNs (5GCNs 110), which may all be in the same country or possibly in different countries, and one Earth station 104 may be shared by more than one sNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the communication system 100. Similarly, the communication system 100 may include a larger (or smaller) number of SVs 190, SVs 102, earth stations 104, sNBs 106, NG-RAN 112, gNBs 114, 5GCNs 110, external clients 140, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and SGCN 140), etc. The UE 105 may also support wireless communication using a Wireless Local Area Network (WLAN) which may connect to other networks (e.g., the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of SGCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GNSS, GLONASS, Galileo or Beidou or some other local or regional Satellite Positioning System (SPS) such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Observed Time Difference of Arrival (OTDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (Rx-Tx) and/or other positioning methods.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g., for latitude, longitude and altitude above or below mean sea level).

The UEs 105 are configured to communicate with 5GCNs 110 via the SVs 102, earth stations 104, and sNBs 106. As illustrated by NG-RAN 112, the NG-RANs associated with the 5GCNs 110 may include one or more sNBs 106. The NG-RAN 112 may further include a number of terrestrial base stations, such as gNB 114. Pairs of terrestrial and/or satellite base stations, e.g., gNBs 114 and sNB 106-1 in NG-RAN 112 may be connected to one another using terrestrial links—e.g., directly as shown in FIG. 1 or indirectly via other gNBs 114 or sNBs 106 and communicate using an Xn interface. Access to the 5G network is provided to UEs 105 via wireless communication between each UE 105 and a serving sNB 106, via an SV 102 and an earth station 104. The sNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more sNBs 106 and/or gNBs 114 in NG-RAN 112—e.g., directly or indirectly via other sNBs 106, gNBs 114 and/or other ng-eNBs. An ng-eNB may provide LTE wireless access and/or evolved LTE (eLTE) wireless access to a UE 105.

An sNB 106 may be referred to by other names such as a gNB, "satellite node" or "satellite access node." The sNBs 106 are not the same as terrestrial gNB 114, but may be based on a terrestrial gNB 114 with additional capability. For example, an sNB 106 may terminate the radio interface and associated radio interface protocols to UEs 105 and may transmit DL signals to UEs 105 and receive UL signals from UEs 105 via SVs 102 and ESs 104. An sNB 106 may also support signaling connections and voice and data bearers to UEs 105 and may support handover of UEs 105 between different radio cells for the same SV 102, between different SVs 102 and/or between different sNBs 106. In some systems, an sNB 106 may be referred to as a gNB or as an enhanced gNB. SNBs 106 may be configured to manage moving radio beams (for LEO SVs) and associated mobility of UEs 105. The sNBs 106 may assist in the handover (or transfer) of SVs 102 between different Earth stations 104, different sNBs 106, and between different countries. The sNBs 106 may hide or obscure specific aspects of connected SVs 102 from the 5GCN 110, e.g., by interfacing to a 5GCN 110 in the same way or in a similar way to a gNB 114, and may avoid a 5GCN 110 from having to maintain configuration information for SVs 102 or perform mobility management related to SVs 102. The sNBs 106 may further assist in sharing of SVs 102 over multiple countries. The sNBs 106 may communicate with one or more earth stations 104, e.g., as illustrated by sNB 106-2 communicating with earth stations 104-2 and 104-1. The sNBs 106 may be separate from earth stations 104, e.g., as illustrated by sNBs 106-1 and 106-2, and earth stations 104-1 and 104-2. The sNBs 106 may include or may be combined with one or more earth stations 104, e.g., using a split architecture. For example, sNB 106-3 is illustrated with a split architecture, with an sNB central unit (sNB-CU) 107 and the earth stations 104-3 and 104-4 acting as Distributed Units (DUs). An sNB 106 may typically be fixed on the ground with transparent SV operation. In one implementation, one sNB 106 may be physically combined with, or physically connected to, one ES 104 to reduce complexity and cost.

The earth stations 104 may be shared by more than one sNB 106 and may communicate with UE 105 via the SVs 102. An earth station 104 may be dedicated to just one SVO and to one associated constellation of SV 102 and hence may be owned and managed by the SVO. While earth stations 104 may be included within an sNB 106, e.g., as an sNB-DU within sNB 106-3, this may only occur when the same SVO or the same MNO owns both the sNB 106 and the included ESs 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR and LTE communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. The methods and techniques described herein for support of a RAN location server function may be applicable to such other networks.

The sNBs 106 and gNBs 114 may communicate with an Access and Mobility Management Function (AMF) 122 in a 5GCN 110, which, for positioning functionality, may communicate with a Location Management Function (LMF) 124. For example, the sNBs 106 may provide an N2 interface to the AMF 122. An N2 interface between an sNB 106 and a 5GCN 110 may be the same as an N2 interface supported between a gNB 114 and a 5GCN 110 for terrestrial NR access by a UE 105 and may use the Next Generation Application Protocol (NGAP) defined in 3GPP Technical Specification (TS) 38.413 between an sNB 106 and the AMF 122. The AMF 122 may support mobility of the UE 105, including cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from the GMLC 126. The LMF 124 may be connected to AMF 122 and/or to GMLC 126. In some aspects, a node/system that implements the LMF 124 may additionally or alternatively implement other types of location-support modules, such as an Enhanced Serving Mobile Location Center (E-SMLC). It is noted that in some aspects, at least part of the positioning functionality (including derivation of a UE 105's location) may be performed at the UE 105 (e.g., using signal measurements obtained by UE 105 for signals transmitted by SVs 120, SVs 190, gNBs 114 and assistance data provided to the UE 105, e.g., by LMF 124).

The Gateway Mobile Location Center (GMLC) 126 may support a location request for the UE 105 received from an external client 140 and may forward such a location request to the AMF 122 for forwarding by the AMF 122 to the LMF 124 or may forward the location request directly to the LMF 124. A location response from the LMF 124 (e.g., containing a location estimate for the UE 105) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 1 though only one of these connections may be supported by 5GCN 110 in some implementations.

A Network Exposure Function (NEF) 128 may be included in 5GCN 110. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet 175. The UPF 130 may be connected to sNBs 106 and gNBs 114. UPF 130 functions may include: external Protocol Data Unit (PDU) session point of interconnect to a Data Network, packet (e.g., Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and/or NEF 128. The external client 140 may optionally be connected to the core network 110 and/or to a location server, which may be, e.g., an SLP, that is external to 5GCN 110, via the Internet 175. The external client 140 may be connected to the UPF 130 directly (not shown in FIG. 1) or through the Internet 175. The external client 140 may be a server, a web server, or a user device, such as a personal computer, a UE, etc.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such aspects, the 5GCN 110 may be configured to control different air interfaces. For example, in some aspects, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Support of transparent SVs with the network architecture shown in FIG. 1 may impact the communication system as follows. The 5GCN 110 may treat a satellite RAT as a new type of RAT (e.g., having longer delay, reduced bandwidth and higher error rate). Consequently, while there may be some impact to Protocol Data Unit (PDU) session establishment and mobility management (MM) and connection management (CM) procedures. Impacts to an AMF 122 (or LMF 124) may be small—e.g., such as providing pre-configured data for fixed tracking areas (TAs) and cells to a UE 105 during Registration. There may be no impact to the SVs 102. The SVs 102 may be shared with other services (e.g., satellite TV, fixed Internet access) with 5G NR mobile access for UEs added in a transparent manner. This may enable legacy SVs 102 to be used and may avoid the need to deploy a new type of SV 102. Further, the sNBs 106 may be fixed and may be configured to support one country and one or more PLMNs in that country. The sNBs 106 may need to assist assignment and transfer of SVs 102 and radio cells between sNBs 106 and earth stations 104 and support handover of UEs 105 between radio cells, SVs 102 and other sNBs 106. Thus, the sNB 106 may differ from a terrestrial gNB 114. Additionally, a coverage area of an sNB 106 may be much larger than the coverage area of a gNB 114.

In some implementations, the radio beam coverage of an SV 102 may be large, e.g., up to or greater than 1000 kms across, and may provide access to more than one country. An earth station 104 may be shared by multiple sNBs (e.g., earth station 104-1 may be shared by sNBs 106-1 and 106-2), and an sNB 106 may be shared by multiple core networks in separate PLMNs located in the same country or in different countries (e.g., sNB 106-2 may be shared by 5GCN1 110-1 and 5GCN2 110-1, which may be in different PLMNs in the same country or in different countries).

Figure 2:
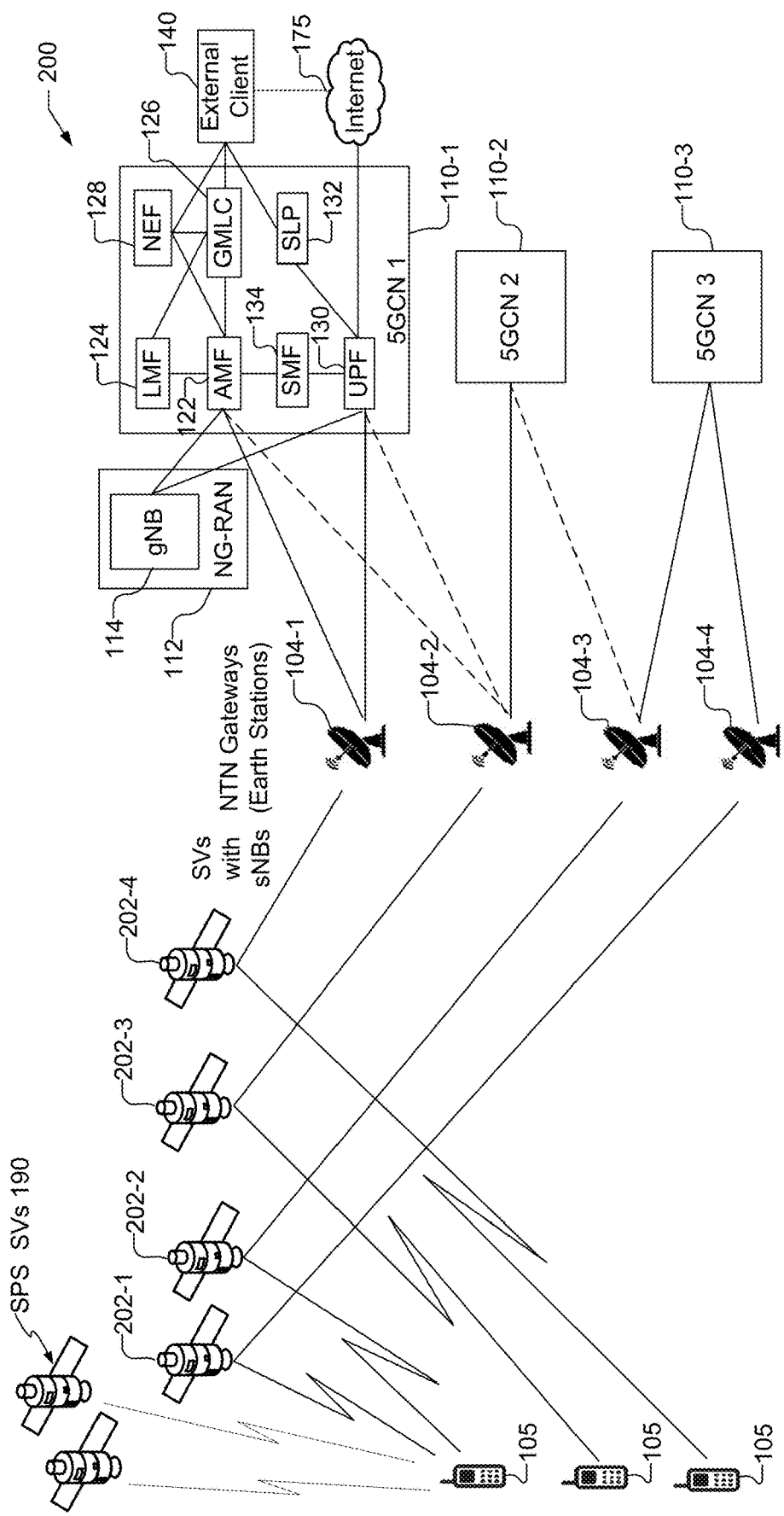
FIG. 2 is a diagram of a communication system with a network architecture having regenerative SVs that is capable of supporting satellite access to a wireless network.

FIG. 2 is a diagram of a communication system 200 capable of supporting satellite access using 5G New Radio (NR) or some other wireless access type such as Code Division Multiple Access (CDMA), according to an aspect. The network architecture shown in FIG. 2 is similar to that shown in FIG. 1, like designated elements being similar or the same. FIG. 2, however, illustrates a network architecture with regenerative SVs 202-1, 202-2, 202-3, and 202-4 (collectively SVs 202), as opposed to transparent SVs 102 shown in FIG. 1. A regenerative SV 202, unlike a transparent SV 102, includes an on-board sNB 202 (or at least the functional capabilities of an sNB), and is sometimes referred to herein as an SV/sNB 202. Reference to an sNB 202 is used herein when referring to SV/sNB 202 functions related to communication with UEs 105 and 5GCNs 110, whereas reference to an SV 202 is used when referring to SV/sNB 202 functions related to communication with ESs 104 and with UEs 105 at a physical radio frequency level. However, there may be no precise delimitation of an SV 202 versus an sNB 202.

An onboard sNB 202 may perform some or all of the same functions as an sNB 106 as described previously. For example, an sNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. An sNB 202 may also support signaling connections and voice and data bearers to UEs 105 and may support handover of UEs 105 between different radio cells for the same sNB 202 and between different sNBs 202. The sNBs 202 may assist in the handover (or transfer) of SVs 202 between different Earth stations 104, different 5GCNs 110, and between different countries. The sNBs 202 may hide or obscure specific aspects of SVs 202 from the 5GCN 110, e.g., by interfacing to a 5GCN 110 in the same way or in a similar way to a gNB 114. The sNBs 202 may further assist in sharing of SVs 202 over multiple countries. The sNBs 202 may communicate with one or more earth stations 104 and with one or more 5GCNs 110 via the ESs 104. In some implementations, sNBs 202 may communicate directly with other sNBs 202 using Inter-Satellite Links (ISLs) (not shown in FIG. 2), which may support an Xn interface between any pair of sNBs 202.

With LEO SVs, an SV/sNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN2 110-2, and earth stations 104-3 and 104-4 are connected to 5GCN3 110-3. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2, and earth station 104-3 may be connected to both 5GCN2 110-2 and 5GCN3 110-3. The 5GCN 110 may need to be aware of SV 202 coverage areas in order to page UEs 105 and to manage handover. Thus, as can be seen, the network architecture with regenerative SVs may have more impact and complexity with respect to both sNBs 202 and 5GCNs 110 than the network architecture with transparent SVs 102 shown in FIG. 1.

Support of regenerative SVs with the network architecture shown in FIG. 2 may impact the communication system 200 as follows. The 5GCN 110 may be impacted if fixed TAs and cells are not supported, since core components of mobility management and regulatory services, which are typically based on fixed cells and fixed TAs for terrestrial PLMNs, would have to be replaced by a new system (e.g., based on UE 105 location). If fixed TAs and fixed cells are supported, a 5GCN 110 (e.g., the AMF 122) may need to map any fixed TA to one or SVs 202 with current radio coverage of the TA when performing paging of a UE 105 that is located in this TA. This could require configuration in the 5GCN 110 of long term orbital data for SVs 202 (e.g., obtained from an SVO for SVs 202) and could add significant new impact to a 5GCN 110.

Legacy SVs would need a substantial software (SW) update to support sNB 202 functions, which may not be feasible. An SV 202 would also need to fully support all UEs 105 accessing the SV 202, which could be problematic with a legacy SV due to limited processing and storage capability. Hence, an SV 202 would probably need to comprise new hardware (HW) and SW rather than being based on a SW upgrade to an existing SV. A new SV/sNB 202 may need to support regulatory and other requirements for multiple countries. A GEO SV 202 coverage area would typically include several or many countries, whereas a LEO or medium earth orbit (MEO) SV 202 would typically orbit over many countries. Support of fixed TAs and fixed cells may then require that a SV/sNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/sNB 202 complexity and at the expense of more 5GCN 110 complexity. Additionally, SV/sNB 202 to SV/sNB 202 ISLs would typically change dynamically as relative SV/sNB 202 positions change, making Xn related procedures more complex.

Figure 3:
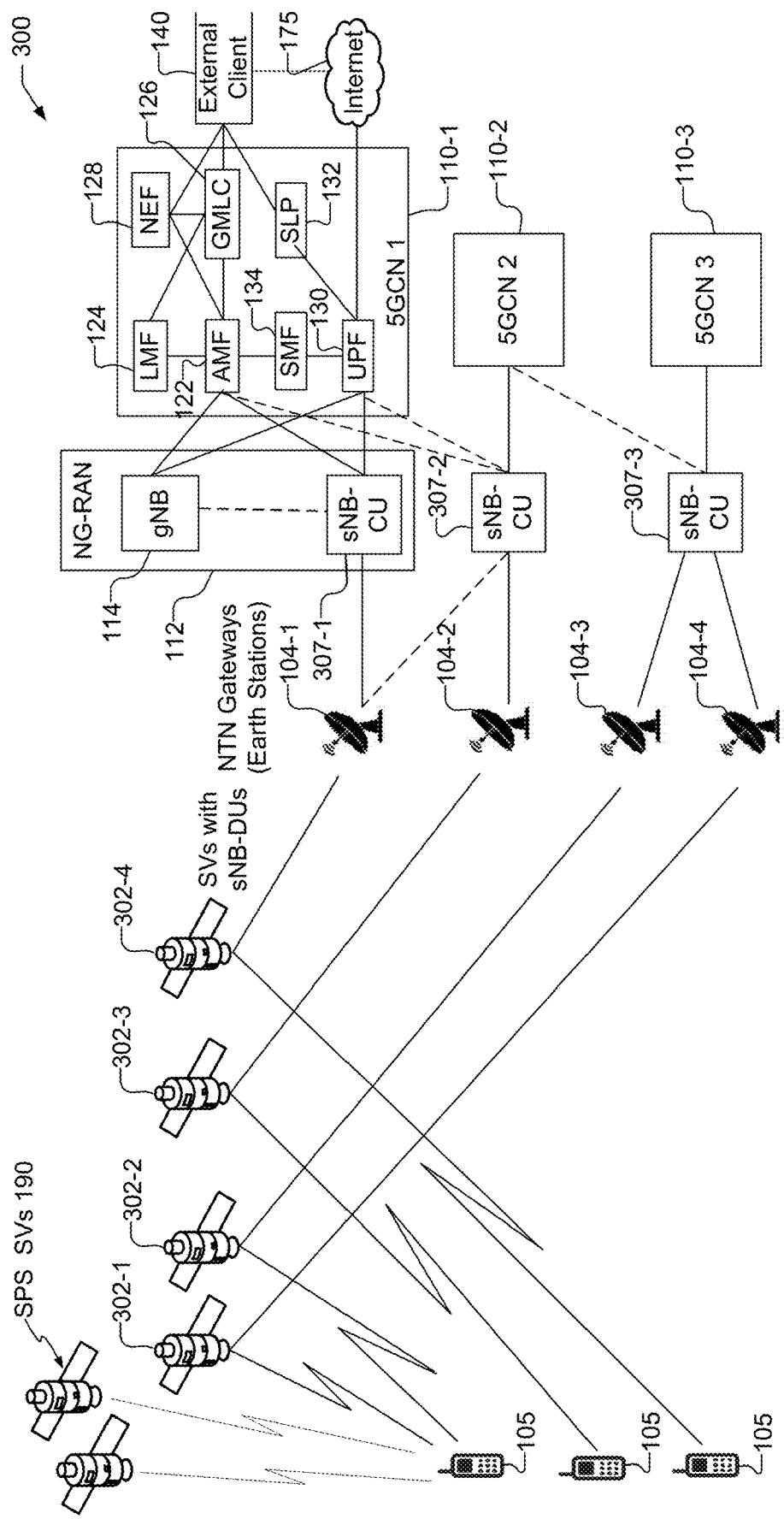
FIG. 3 is a diagram of a communication system with a network architecture having regenerative SVs and a split satellite Node B (sNB) architecture that is capable of supporting satellite access to a wireless network.

FIG. 3 is a diagram of a communication system 300 capable of supporting satellite access using 5G New Radio (NR) or some other wireless access type such as Code Division Multiple Access (CDMA), according to an aspect. The network architecture shown in FIG. 3 is similar to that shown in FIGS. 1 and 2, like designated elements being similar or the same. FIG. 3, however, illustrates a network architecture with regenerative SVs 302-1, 302-2, 302-3, and 302-4 (collectively referred to as SVs 302), as opposed to transparent SVs 102 shown in FIG. 1, and with a split architecture for the sNBs. A regenerative SV 302, unlike a transparent SV 102, includes an on-board sNB Distributed Unit (sNB-DU) 302, and is sometimes referred to herein as an SV/sNB-DU 302. Reference to an sNB-DU 302 is used herein when referring to SV/sNB 302 functions related to communication with UEs 105 and sNB-CUs 307, whereas reference to an SV 302 is used when referring to SV/sNB-DU 302 functions related to communication with ESs 104 and with UEs 105 at a physical radio frequency level. However, there may be no precise delimitation of an SV 302 versus an sNB-DU 302.

Each sNB-DU 302 communicates with one ground based sNB-CU 307 via one or more ESs 104. One sNB-CU 307 together with the one or more sNB-DUs 302 which are in communication with the sNB-CU 307 performs functions, and may use internal communication protocols, which are similar to or the same as a gNB with a split architecture as described in 3GPP TS 38.401. Here an sNB-DU 302 corresponds to and performs functions similar to or the same as a gNB Distributed Unit (gNB-DU) defined in TS 38.401, while an sNB-CU 307 corresponds to and performs functions similar to or the same as a gNB Central Unit (gNB-CU) defined in TS 38.401. For example, an sNB-DU 302 and an sNB-CU 307 may communicate with one another using an F1 Application Protocol (FLAP) as defined in 3GPP TS 38.473 and together may perform some or all of the same functions as an sNB 106 or sNB 202 as described previously. To simplify references to different types of sNB is the description below, an sNB-DU 302 may sometimes be referred to as an sNB 302 (without the "DU" label), and an sNB-CU 307 may sometimes be referred to as an sNB 307 (without the "CU" label).

An sNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. An sNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322.

The operation of an sNB-DU 302 is partly controlled by the associated sNB-CU 307. One sNB-DU 302 may support one or more NR radio cells for UEs 105. An sNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. An sNB-CU 307 may also be split into separate control plane (sNB-CU-CP) and user plane (sNB-CU-UP) portions, where an sNB-CU-CP communicates with one or more AMFs 122 in one more 5GCNs 110 using the NGAP protocol and where an sNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. An sNB-DU 302 and sNB-CU 307 may communicate over an F1 interface to (a) support control plane signaling for a UE 105 using Internet Protocol (IP), Stream Control Transmission Protocol (SCTP) and F1 Application Protocol (FLAP) protocols, and (b) to support user plane data transfer for a UE using IP, User Datagram Protocol (UDP), PDCP, SDAP, GTP-U and NR User Plane Protocol (NRUPP) protocols.

An sNB-CU 307 may communicate with one or more other sNB-CUs 307 and/or with one more other gNBs 114 using terrestrial links to support an Xn interface between any pair of sNB-CUs 307 and/or between any sNB-CU 307 and any gNB 114.

An sNB-DU 302 together with an sNB-CU 307 may: (i) support signaling connections and voice and data bearers to UEs 105; (ii) support handover of UEs 105 between different radio cells for the same sNB-DU 302 and between different sNB-DUs 302; and (iii) assist in the handover (or transfer) of SVs 302 between different Earth stations 104, different 5GCNs 110, and between different countries. An sNB-CU 307 may hide or obscure specific aspects of SVs 302 from a 5GCN 110, e.g., by interfacing to a 5GCN 110 in the same way or in a similar way to a gNB 114. The sNB-CUs 307 may further assist in sharing of SVs 302 over multiple countries.

In communication system 300, the sNB-DUs 302 that communicate with and are accessible from any sNB-CU 307 will change over time with LEO SVs 302. With the split sNB architecture, a 5GCN 110 may connect to fixed sNB-CUs 307 which do not change over time and which may reduce difficulty with paging of a UE 105. For example, a 5GCN 110 may not need to know which SV/sNB-DUs 302 are needed for paging a UE 105. The network architecture with regenerative SVs 302 with a split sNB architecture may thereby reduce 5GCN 119 impact at the expense of additional impact to an sNB-CU 307.

Support of regenerative SVs 302 with a split sNB architecture as shown in FIG. 3 may impact the communication system 300 as follows. The impact to 5GCN 110 may be limited as for transparent SVs 102 discussed above. For example, the 5GCN 110 may treat a satellite RAT in communication system 300 as a new type of RAT with longer delay, reduced bandwidth and higher error rate. Consequently, while there may be some impact to PDU session establishment and Mobility Management (MM) and Connection Management (CM) procedures, impacts to an AMF 122 (or LMF 124) may be small—e.g., such as providing pre-configured data for fixed TA and fixed cells to a UE 105 during Registration. The impact on SV/sNB-DUs 302 may be less than the impact on SV/sNBs 202 (with non-split architecture), as discussed above in reference to FIG. 2. The SV/sNB-DU 302 may need to manage changing association with different (fixed) sNB-CUs 307. Further, an SV/sNB-DU 302 may need to manage radio beams and radio cells. The sNB-CU 307 impacts may be similar to sNB 106 impacts for a network architecture with transparent SVs 102, as discussed above, except for extra impacts to manage changing associations with different sNB-DUs 302 and reduced impacts to support radio cells and radio beams which may be transferred to sNB-DUs 302.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SDOs are widely known to the industry.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complication. For example, if a beam is shared by two or more countries, earth stations 104 and sNBs 106/202/302/307 in one country may need to support UE 105 access from other countries. Sharing a beam over multiple countries may raise security issues for privacy of both data and voice.

Further, sharing an SV beam over multiple countries may raise regulatory conflicts. For example, regulatory services including WEA, LI, and EM calls in a first country could need support from sNBs 106/202/307 and earth stations 104 in a second country that shares the same SV beam.

A first solution to complications raised by beam sharing amongst multiple countries may be to assign one beam to one country. The assignment of a beam to a single country additionally implies assigning each radio cell to one country. This solution may not preclude or prevent beam and radio cell coverage of additional countries, but can restrict UE access to a beam and associated radio cell to just UEs 105 in the country to which the beam and associated radio cell are assigned. A second solution for beam sharing over multiple countries could be to allow a 5GCN 110 in one country to support UEs 105 located in other countries where regulatory approval for this was obtained from the other countries. A third solution could be to share an sNB 106/202/307 among 5GCNs 110 located in different countries (e.g., as in the case of sNB 106-2, sNB 202-2 and sNB 307-2 shown in FIGS. 1-3), and to verify that each UE 105 accessing the sNB 106/202/307 is registered in and connected to a 5GCN 110 that is in the same country as the UE 105 or permitted to serve the country in which the UE 105 is located.

Figure 4:
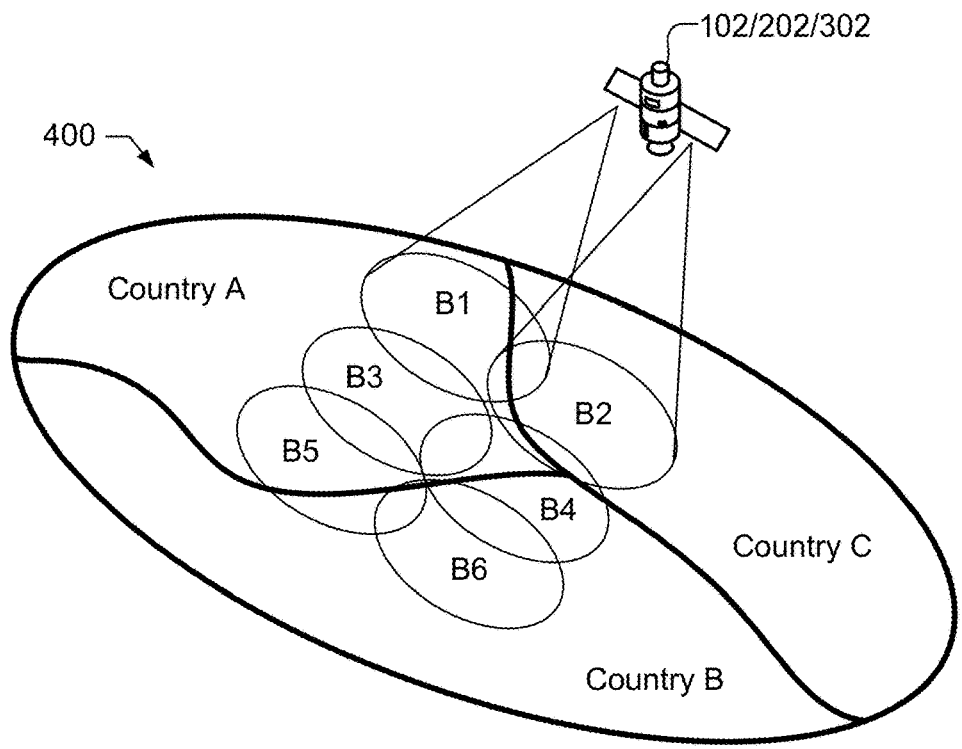
FIG. 4 illustrates an SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country as for the first solution above, beams B1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay. or mostly stay, within one country, which is sometimes referred to as a "steerable beam". For example, beam coverage may move slowly within one country and then hop to a new country, e.g., after an SV 102, 202, 302 has transferred to a new earth station 104 or new sNB 106 or 307.

Figure 5:
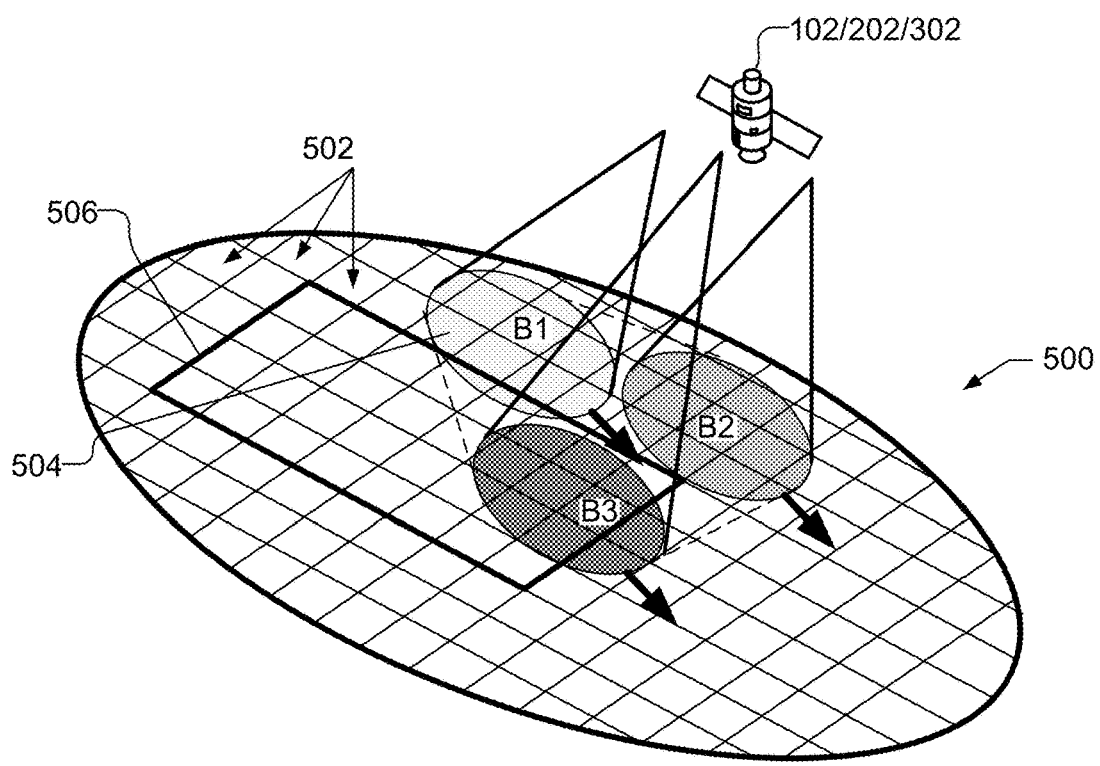
FIG. 5 illustrates radio cells produced by an SV over an area that includes a number of fixed cells.

FIG. 5 illustrates radio cells produced by an SV 102, 202, 302 over an area 500 that includes a number of Earth fixed cells 502. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202. 302 may overlap with many 5GCN terrestrial cells. When supporting satellite access to a wireless network, radio beams and radio cells produced by an SV 102, 202, 302 may be hidden from a 5GCN 110.

As illustrated in FIG. 5, an area 500 may include a number of Earth fixed cells 502, as well as fixed tracking areas (TAs) such as TA 506. Fixed cells are not "real cells," e.g., used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a radio cell which typically changes with time for a LEO or MEO SV. A fixed cell 502 may be treated by a 5GCN 110 the same as a cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 105 with minimal new impact.

With regenerative SVs 202 with a non-split architecture as in communication systems 200, each radio cell may remain with the same SV 202 and may have a moving coverage area supporting different 5GCNs 110 at different times.

With transparent SVs 102 and regenerative SVs 302 for a split architecture as in communication system 300, each radio cell may be assigned to and controlled by one sNB 106 or 307 on behalf of one or more PLMNs in one country. For a GEO SV 102/302, the assignment to an sNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For an NGEO SV 102/302, the assignment might last for a short time, e.g., only 5-15 minutes. A non-permanent radio cell may then be transferred to a new sNB 106/307 as necessary (e.g., when access to the NGEO SV 102/302 is transferred to the new sNB 106/307). Each sNB 106/307, for example, may have a fixed geographic coverage area, e.g., comprising a plurality of fixed cells 502 and fixed TAs. A radio cell for a first NGEO SV 102/302 may be transferred from a first sNB 106/307 to a second sNB 106/307 when (or after) moving into the fixed coverage area of the second sNB 106/307. Prior to this transfer, UEs 105 accessing the radio cell in a connected state may be moved to a new radio cell for the first sNB 106/307 or could be handed off to the second sNB 106/307 as part of transferring the radio cell. An SV 102/302 may be accessed from only one sNB 106/307 or from multiple sNBs 106/307, possibly in different countries. In one implementation, an SV 102/302 may be assigned to multiple sNBs 106/307 by partitioning radio cells produced by the SV 102/302 among the different sNBs 106/307. Radio cells may then be transferred to new sNBs 106/307 (and to new countries) as the SV 102/302 moves or as traffic demands change. Such an implementation would be a form of a soft handoff in which SV 102/302 transfer from one sNB 106/307 to another 106/307 occurs in increments of radio cells and not all at once.

Figure 6:
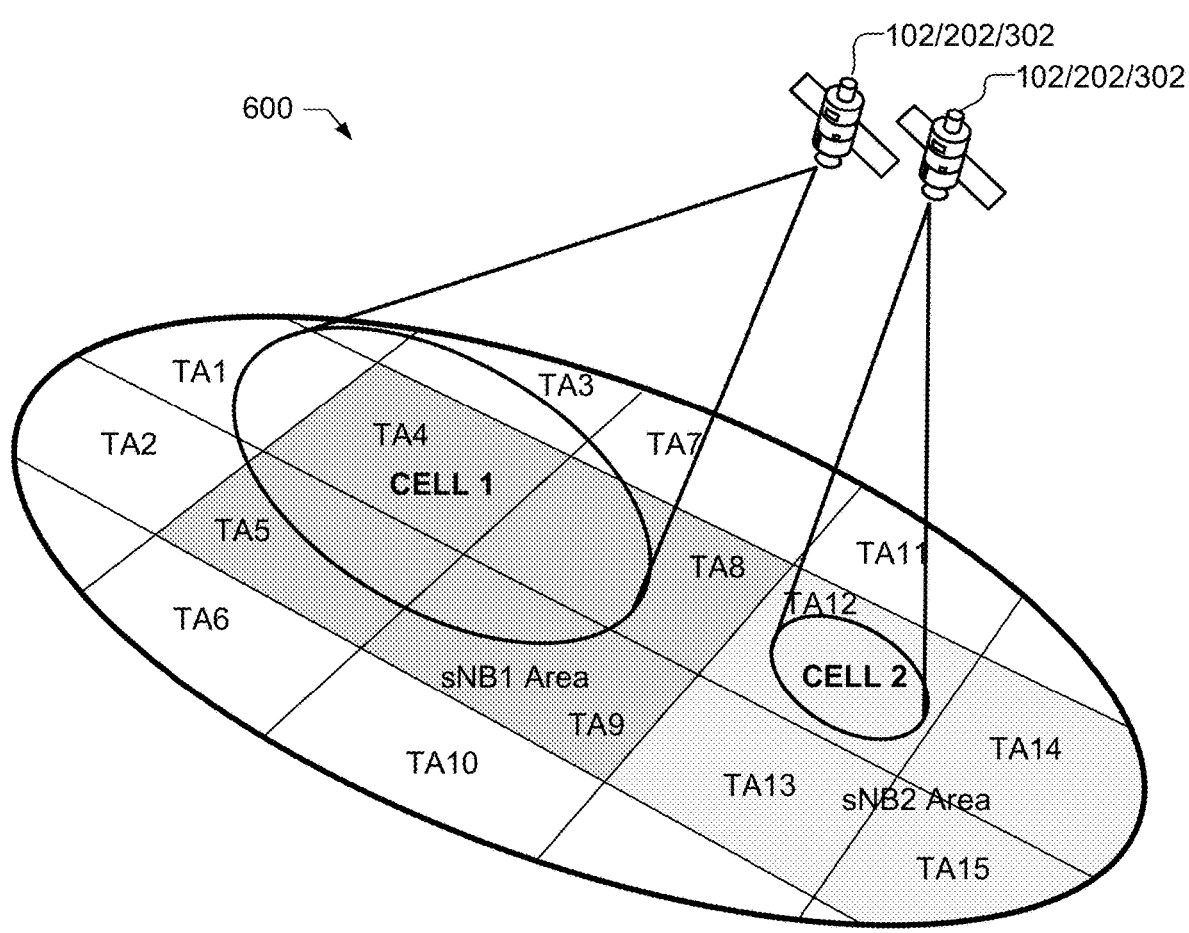
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, wherein TA4, TA5, TA8, and TA9 are assigned to an sNB1 (which may be an sNB 106, sNB 202 or an sNB 307), and TA12, TA13, TA14, and TA15 are assigned to an sNB2 (which may be another sNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g., where the ID of TA comprises a Tracking Area Code (TAC)). For an NGEO SV, the supported PLMNs and TAs may change as radio cell coverage areas change. An sNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g., Cell 1 and Cell 2). An sNB 106/202/307 may then update SIB broadcasting.

Thus, as illustrated in FIG. 6, an SV 102/202/302 may broadcast for cell 1 a SIB that includes TACs for TA4 and possibly TA1, TA3, TA5, TA8 and/or TA9. Similarly, the SV 102/202/302 or another SV 102/202/302 may broadcast for Cell 2 a SIB that includes a TAC for TA12 only. The Cell 1 may be assigned to sNB1 (which has coverage of TA4, TA5, TA8, and TA9) and Cell 2 may be assigned to sNB2 (which has coverage of TA12, TA13, TA14, and TA15). Cell 1 and Cell 2 may be transferred from sNB1 to sNB2 or from sNB2 to sNB1 if the cell coverage area moves from one sNB area to another.

The coverage area for a fixed TA may be defined in a manner that is simple, precise, flexible and requires minimal signaling for conveyance to a UE 105 or sNB 106/202/307. A fixed TA area may be small enough to allow efficient paging by comprising an area supported by just a few radio cells (e.g., less than 20) and may also be large enough to avoid excessive UE registration (e.g., may extend at least several kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or sNB 106/202/307. A fixed cell coverage area may allow for simple and precise association with a fixed TA, e.g., one fixed cell may belong unambiguously to one TA.

Fixed cells may be used by a wireless core network, such as a SGCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

Figure 7A:
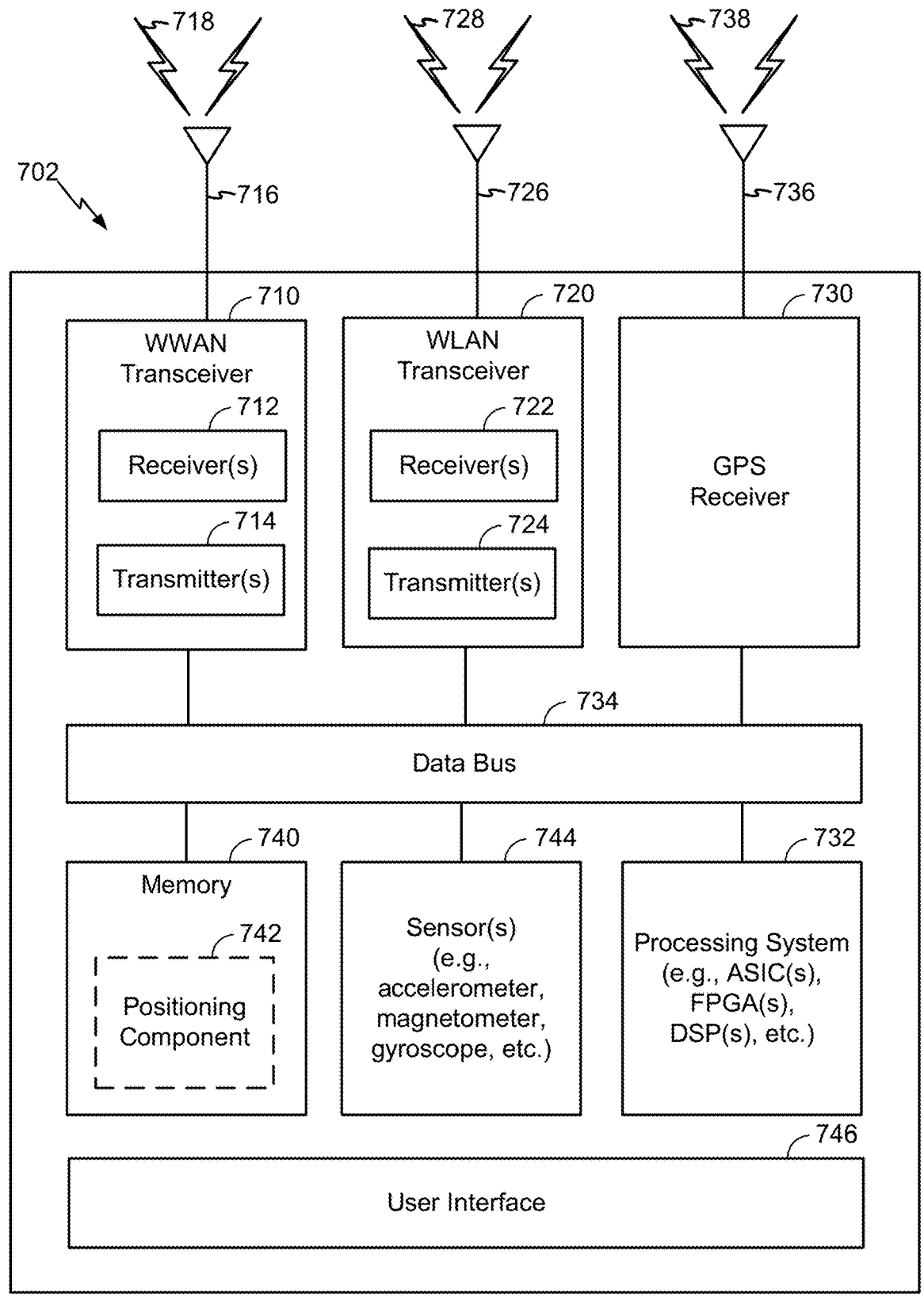
FIGS. 7A to 7C are simplified block diagrams of several sample aspects of components that may be employed in a UE, a non-terrestrial vehicle, and a network entity, respectively.
Figure 7B:
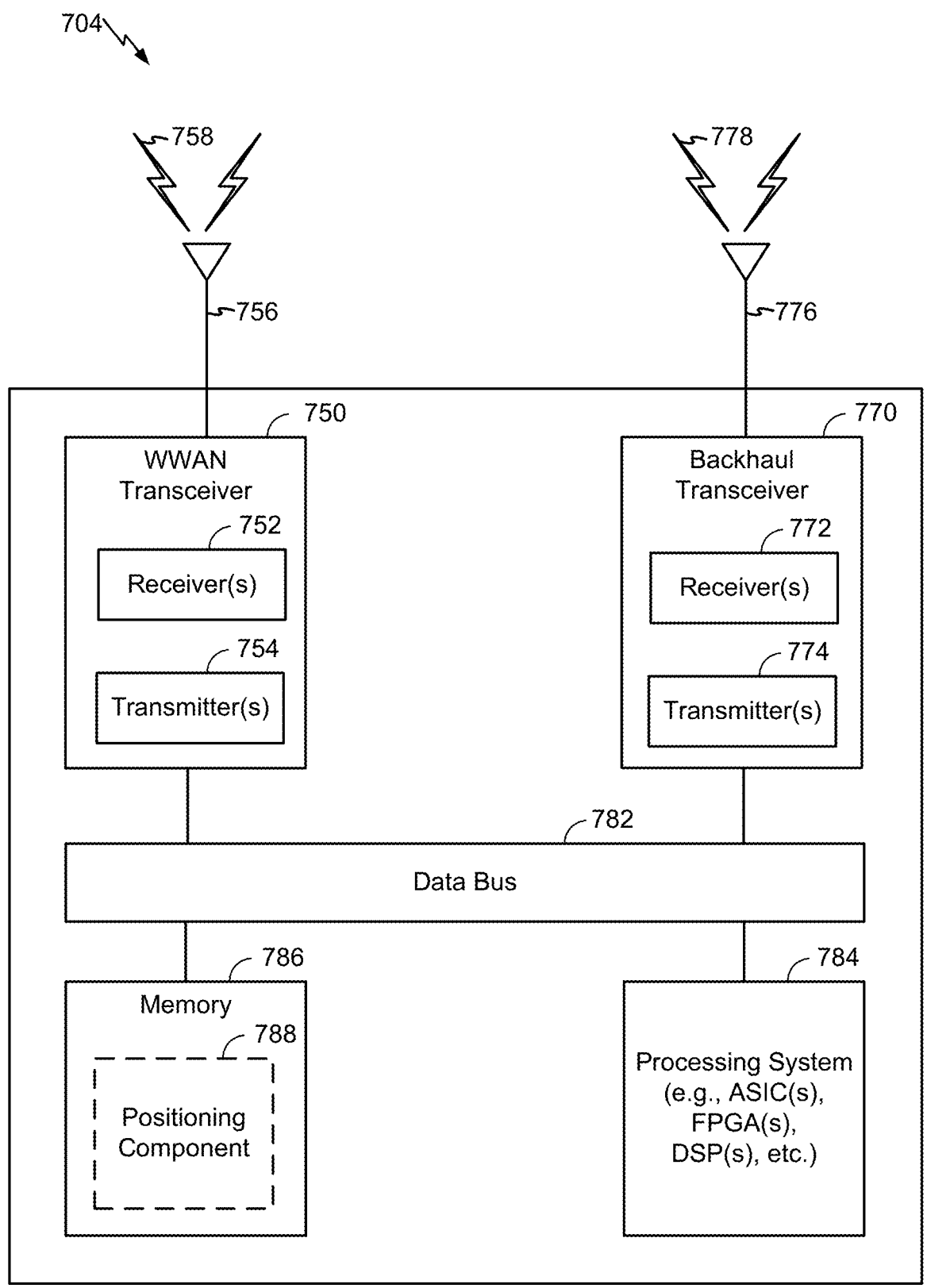
Figure 7C:
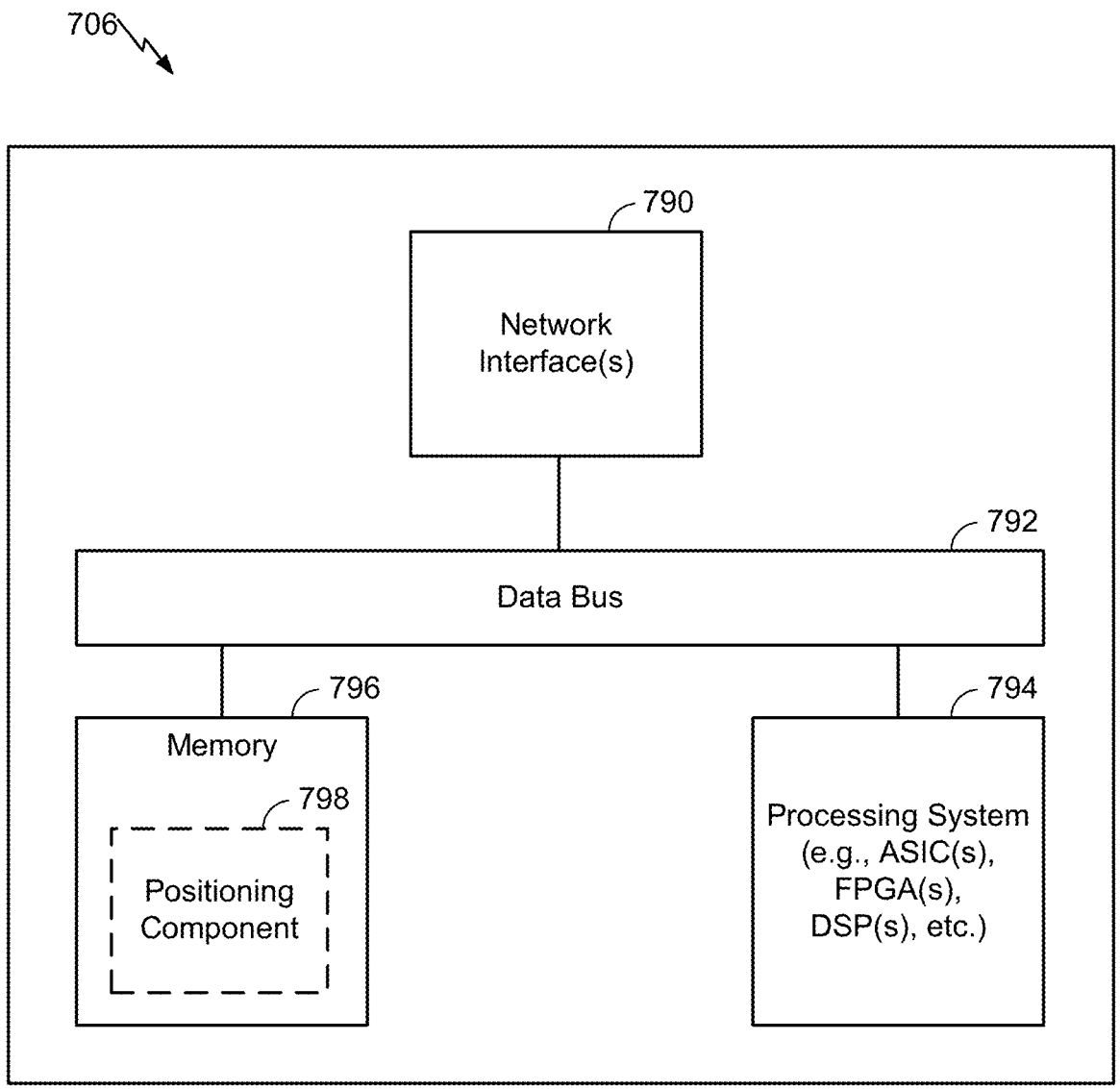

FIGS. 7A, 7B, and 7C illustrate several example components (represented by corresponding blocks) that may be incorporated into a UE 702 (which may correspond to any of the UEs described herein, such as UE 105 in FIGS. 1-3), a non-terrestrial vehicle 704 (which may correspond to any of the non-terrestrial vehicles described herein, such as SVs 102, 202, 302 and sNBs 202 and 302), and a network entity 706 (which may correspond to or embody any of the network functions described herein, including the sNB 106, the sNB 307, LMF 124, the SLP 132, AMF 122, SMF 134, NTN gateways 104, etc.) to support the wireless positioning operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 702 and the non-terrestrial vehicle 704 each include wireless wide area network (WWAN) transceivers 710 and 750, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 710 and 750 may be connected to one or more antennas 716 and 756, respectively, for communicating with other network nodes, such as other UEs, access points, base stations (e.g., ng-eNBs, gNBs), non-terrestrial vehicles, etc., via at least one designated RAT (e.g., NR, LTE, GSM, etc.) over a wireless communication medium of interest (e.g., some set of time/frequency resources in a particular frequency spectrum). The WWAN transceivers 710 and 750 may be variously configured for transmitting and encoding signals 718 and 758 (e.g., messages, indications, information, and so on), respectively, and, conversely, for receiving and decoding signals 718 and 758 (e.g., messages, indications, information, pilots, and so on), respectively, in accordance with the designated RAT. Specifically, the transceivers 710 and 750 include one or more transmitters 714 and 754, respectively, for transmitting and encoding signals 718 and 758, respectively, and one or more receivers 712 and 752, respectively, for receiving and decoding signals 718 and 758, respectively.

The UE 702 also includes, at least in some cases, a wireless local area network (WLAN) transceiver 720. The WLAN transceiver 720 may be connected to one or more antennas 726 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceiver 720 may be variously configured for transmitting and encoding signals 728 (e.g., messages, indications, information, and so on), and, conversely, for receiving and decoding signals 728 (e.g., messages, indications, information, pilots, and so on), in accordance with the designated RAT. Specifically, the WLAN transceiver 720 includes one or more transmitters 724 for transmitting and encoding signals 728, and one or more receivers 722 for receiving and decoding signals 728.

The non-terrestrial vehicle 704 includes at least one backhaul transceiver(s) 770. The backhaul transceiver(s) 770 may be connected to one or more antennas 776 for wirelessly communicating with a gateway (e.g., an NTN gateway 104) and/or other non-terrestrial vehicles over a wireless communication medium of interest. The backhaul transceiver(s) 770 may be variously configured for transmitting and encoding signals 778 (e.g., messages, indications, information, and so on), and, conversely, for receiving and decoding signals 778 (e.g., messages, indications, information, pilots, and so on), in accordance with the designated RAT (e.g., NR). Specifically, the backhaul transceiver(s) 770 includes one or more transmitters 774 for transmitting and encoding signals 778, and one or more receivers 772 for receiving and decoding signals 778. Note that although illustrated as separate components, the backhaul transceiver(s) 770 may be the same as or included in the WWAN transceiver(s) 750.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 716, 726, 756, 776), such as an antenna array, that permits the respective apparatus to perform transmit "beamforming," as described herein. Similarly, a receiver may include or be coupled to a plurality of antennas (e.g., antennas 716, 726, 756, 776), such as an antenna array, that permits the respective apparatus to perform receive beamforming, as described herein. In an aspect, the transmitter and receiver may share the same plurality of antennas (e.g., antennas 716, 726, 756, 776), such that the respective apparatus can only receive or transmit at a given time, not both at the same time. A wireless communication device (e.g., the WWAN transceivers 710 and 750, the WLAN transceiver 720, and/or the backhaul transceiver 770) of the UE 702 and/or the non-terrestrial vehicle 704 may also comprise a network listen module (NLM) or the like for performing various measurements.

The UE 702 also includes, at least in some cases, a global positioning systems (GPS) receiver 730. The GPS receiver 730 may be connected to one or more antennas 736 and may provide for receiving and/or measuring GPS signals 738. The GPS receiver 730 may comprise any suitable hardware and/or software for receiving and processing GPS signals 738. The GPS receiver 730 requests information and operations as appropriate from the other systems, and performs calculations necessary to determine the UE's 702 position using measurements obtained by any suitable GPS algorithm.

The network entity 706 includes at least one network interface 790 providing means for communicating (e.g., means for transmitting, means for receiving, etc.) with other network entities. For example, the network interface(s) 790 (e.g., one or more network access ports) may be configured to communicate with one or more network entities via a wire-based or wireless backhaul connection. In some aspects, the network interface(s) 790 may be implemented as one or more transceivers configured to support wire-based and/or wireless signal communication (e.g., where the network entity 706 is a gateway in communication with a non-terrestrial vehicle 704). This communication may involve, for example, sending and receiving messages, parameters, or other types of information.

The UE 702, the non-terrestrial vehicle 704, and the network entity 706 also include other components that may be used in conjunction with the operations as disclosed herein. The UE 702 includes processor circuitry implementing a processing system 732 for providing functionality relating to, for example, positioning operations, and for providing other processing functionality. The non-terrestrial vehicle 704 includes a processing system 784 for providing functionality relating to, for example, positioning operations as disclosed herein, and for providing other processing functionality. The network entity 706 includes a processing system 794 for providing functionality relating to, for example, positioning operations as disclosed herein, and for providing other processing functionality. The processing systems 732, 784, and 794 may therefore provide means for processing, such as means for determining, means for calculating, means for receiving, means for transmitting, means for indicating, etc. In an aspect, the processing systems 732, 784, and 794 may include, for example, one or more general purpose processors, multi-core processors, ASICs, digital signal processors (DSPs), field programmable gate arrays (FPGA), or other programmable logic devices or processing circuitry.

The UE 702, the non-terrestrial vehicle 704, and the network entity 706 include memory circuitry implementing memory components 740, 786, and 796 (e.g., each including a memory device), respectively, for maintaining information (e.g., information indicative of reserved resources, thresholds, parameters, and so on). The memory components 740, 786, and 796 may therefore provide means for storing, means for retrieving, means for maintaining, etc. In some cases, the UE 702, the non-terrestrial vehicle 704, and the network entity 706 may include positioning components 742, 788, and 798, respectively. The positioning components 742, 788, and 798 may be hardware circuits that are part of or coupled to the processing systems 732, 784, and 794, respectively, that, when executed, cause the UE 702, the non-terrestrial vehicle 704, and the network entity 706 to perform the functionality described herein. In other aspects, the positioning components 742, 788, and 798 may be external to the processing systems 732, 784, and 794 (e.g., part of a modem processing system, integrated with another processing system, etc.). Alternatively, the positioning components 742, 788, and 798 may be memory modules (as shown in FIGS. 7A-C) stored in the memory components 740, 786, and 796, respectively, that, when executed by the processing systems 732, 784, and 794 (or a modem processing system, another processing system, etc.), cause the UE 702, the non-terrestrial vehicle 704, and the network entity 706 to perform the functionality described herein.

The UE 702 may include one or more sensors 744 coupled to the processing system 732 to provide means for sensing or detecting movement and/or orientation information that is independent of motion data derived from signals received by the WWAN transceiver 710, the WLAN transceiver 720, and/or the GPS receiver 730. By way of example, the sensor(s) 744 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 744 may include a plurality of different types of devices and combine their outputs in order to provide motion information. For example, the sensor(s) 744 may use a combination of a multi-axis accelerometer and orientation sensors to provide the ability to compute positions in 2D and/or 3D coordinate systems.

In addition, the UE 702 includes a user interface 746 providing means for providing indications (e.g., audible and/or visual indications) to a user and/or for receiving user input (e.g., upon user actuation of a sensing device such as a keypad, a touch screen, a microphone, and so on). Although not shown, the non-terrestrial vehicle 704 and the network entity 706 may also include user interfaces.

Referring to the processing system 784 in more detail, in the downlink, IP packets from the network entity 706 may be provided to the processing system 784 via the backhaul transceiver(s) 770. The processing system 784 may implement functionality for an RRC layer, a packet data convergence protocol (PDCP) layer, a radio link control (RLC) layer, and a medium access control (MAC) layer. The processing system 784 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 754 and the receiver 752 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 754 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially pre-coded to produce multiple spatial streams. Channel estimates from a channel estimator may be used to determine the coding and modulation scheme, as well as for spatial processing. The channel estimate may be derived from a reference signal and/or channel condition feedback transmitted by the UE 702. Each spatial stream may then be provided to one or more different antennas 756. The transmitter 754 may modulate an RF carrier with a respective spatial stream for transmission.

At the UE 702, the receiver 712 receives a signal through its respective antenna(s) 716. The receiver 712 recovers information modulated onto an RF carrier and provides the information to the processing system 732. The transmitter 714 and the receiver 712 implement Layer-1 functionality associated with various signal processing functions. The receiver 712 may perform spatial processing on the information to recover any spatial streams destined for the UE 702. If multiple spatial streams are destined for the UE 702, they may be combined by the receiver 712 into a single OFDM symbol stream. The receiver 712 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the non-terrestrial vehicle 704. These soft decisions may be based on channel estimates computed by a channel estimator. The soft decisions are then decoded and de-interleaved to recover the data and control signals that were originally transmitted by the non-terrestrial vehicle 704 on the physical channel. The data and control signals are then provided to the processing system 732, which implements Layer-3 and Layer-2 functionality.

In the uplink, the processing system 732 provides demultiplexing between transport and logical channels, packet reassembly, deciphering, header decompression, and control signal processing to recover IP packets from the core network. The processing system 732 is also responsible for error detection.

Similar to the functionality described in connection with the downlink transmission by the non-terrestrial vehicle 704, the processing system 732 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the non-terrestrial vehicle 704 may be used by the transmitter 714 to select the appropriate coding and modulation schemes, and to facilitate spatial processing. The spatial streams generated by the transmitter 714 may be provided to different antenna(s) 716. The transmitter 714 may modulate an RF carrier with a respective spatial stream for transmission.

The uplink transmission is processed at the non-terrestrial vehicle 704 in a manner similar to that described in connection with the receiver function at the UE 702. The receiver 752 receives a signal through its respective antenna(s) 756. The receiver 752 recovers information modulated onto an RF carrier and provides the information to the processing system 784.

In the uplink, the processing system 784 provides demultiplexing between transport and logical channels, packet reassembly, deciphering, header decompression, control signal processing to recover IP packets from the UE 702. IP packets from the processing system 784 may be provided to the core network. The processing system 784 is also responsible for error detection.

For convenience, the UE 702, the non-terrestrial vehicle 704, and/or the network entity 706 are shown in FIGS. 7A-7C as including various components that may be configured according to the various examples described herein. It will be appreciated, however, that the illustrated blocks may have different functionality in different designs.

The various components of the UE 702, the non-terrestrial vehicle 704, and the network entity 706 may communicate with each other over data buses 734, 782, and 792, respectively. The components of FIGS. 7A-7C may be implemented in various ways. In some implementations, the components of FIGS. 7A-7C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 710 to 746 may be implemented by processor and memory component(s) of the UE 702 (e.g., by execution of appropriate code and/or by appropriate configuration of processor components). Similarly, some or all of the functionality represented by blocks 750 to 788 may be implemented by processor and memory component(s) of the non-terrestrial vehicle 704 (e.g., by execution of appropriate code and/or by appropriate configuration of processor components). Also, some or all of the functionality represented by blocks 790 to 798 may be implemented by processor and memory component(s) of the network entity 706 (e.g., by execution of appropriate code and/or by appropriate configuration of processor components). For simplicity, various operations, acts, and/or functions are described herein as being performed "by a UE," "by a base station," "by a non-terrestrial vehicle," "by a network entity," etc. However, as will be appreciated, such operations, acts, and/or functions may actually be performed by specific components or combinations of components of the UE, non-terrestrial vehicle, network entity, etc., such as the processing systems 732, 784, 794, the transceivers 710, 720, 750, and 770, the memory components 740, 786, and 796, the positioning components 742, 788, and 798, etc.

Figure 8:
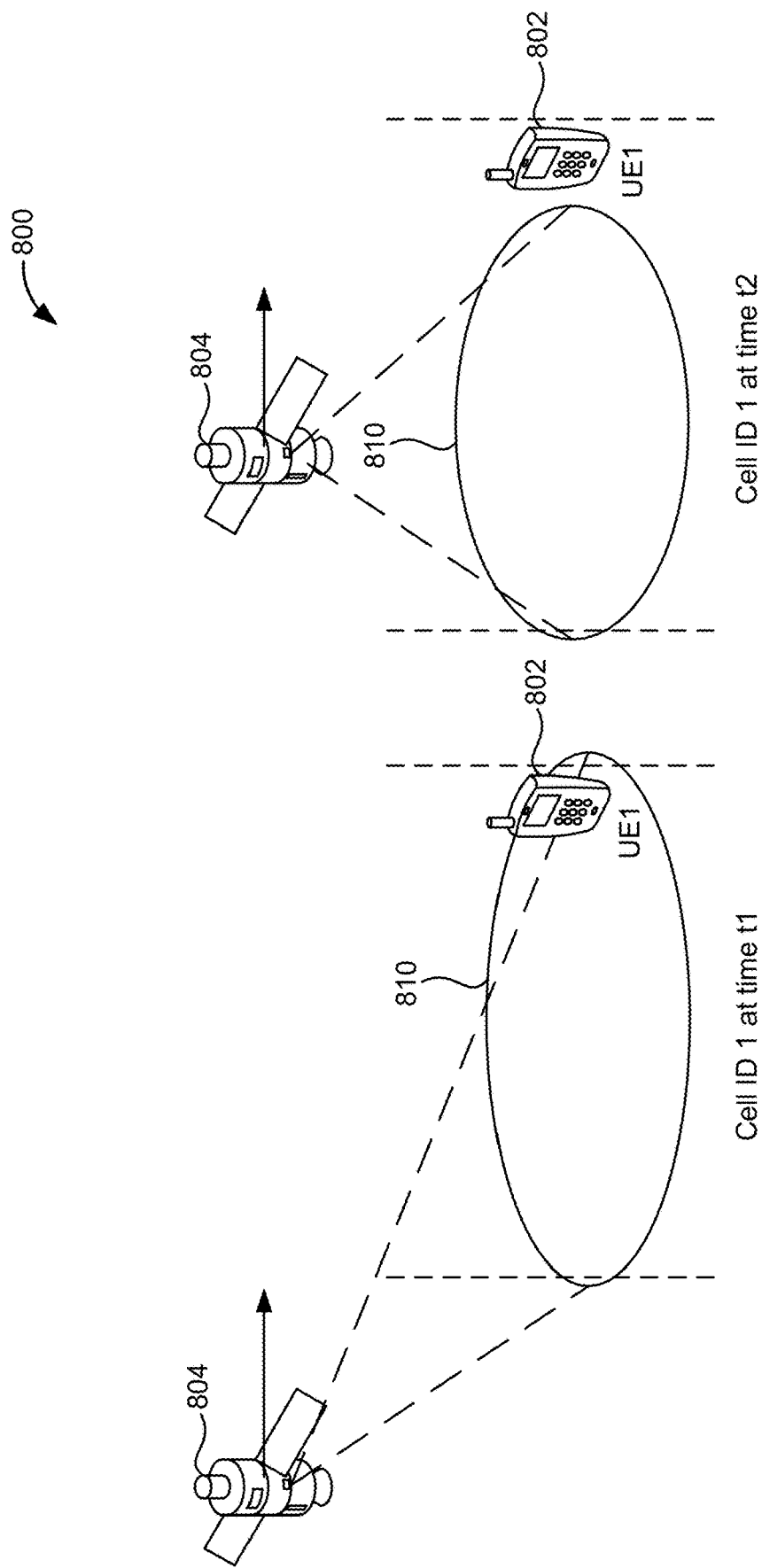
FIG. 8 is a diagram illustrating an example fixed cell scenario and FIG. 9 is a diagram illustrating an example moving cell scenario.
Figure 9:
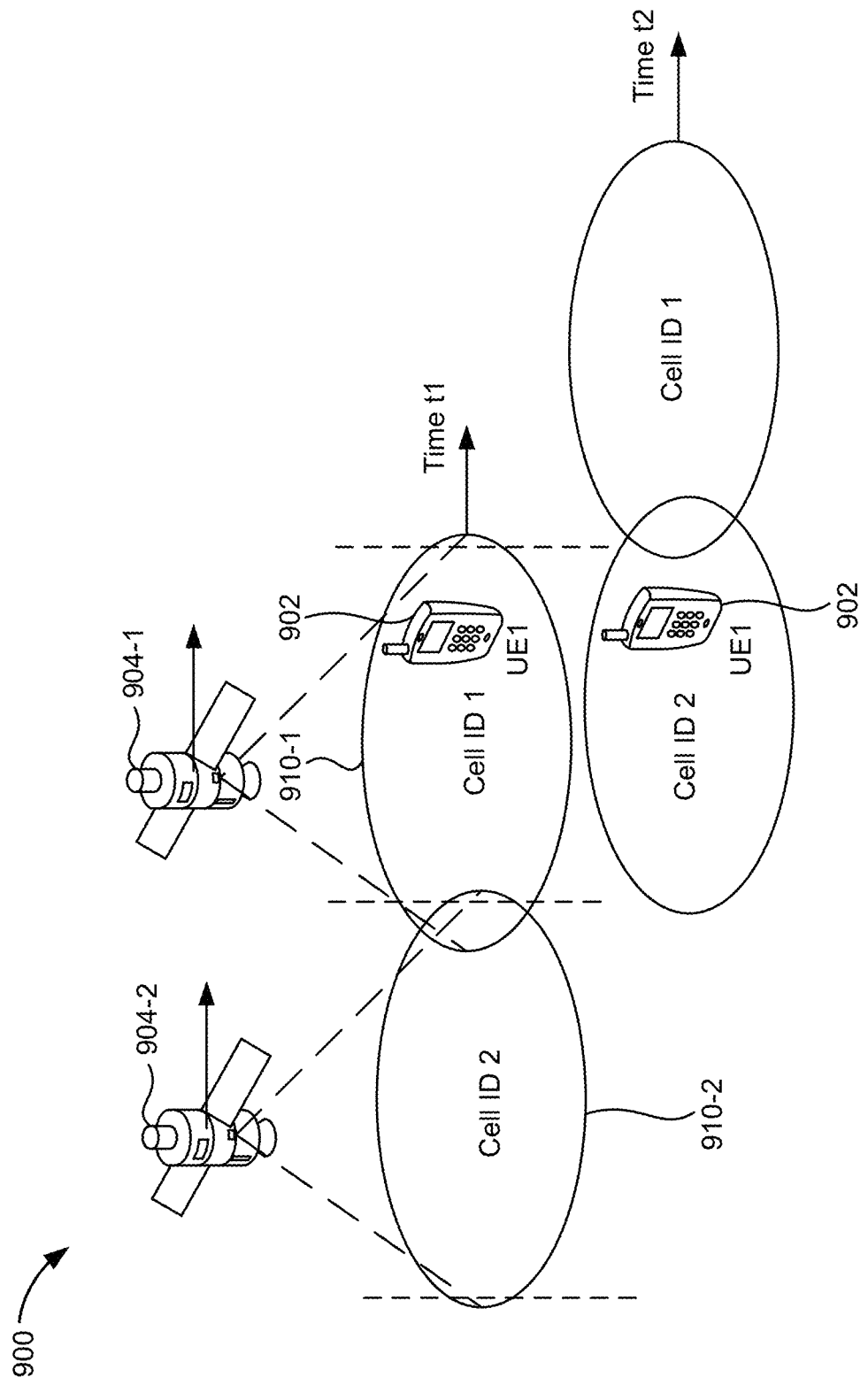

Non-terrestrial vehicles, such as SVs 102/202/302, can provide at least two different types of cell coverage: (1) fixed cell coverage and (2) moving cell coverage. FIG. 8 is a diagram 800 illustrating an example fixed radio cell scenario and FIG. 9 is a diagram 900 illustrating an example moving radio cell scenario. In the example of FIG. 8, a UE 802 (e.g., any of the UEs described herein, such as UE 105 in FIGS. 1-3) is within the geographic coverage area 810 of a non-terrestrial vehicle 804 (e.g., any of the non-terrestrial vehicles described herein, such a SVs 102, 202, or 302), which is illustrated in FIG. 8 as a satellite. The UE 802 can communicate wirelessly with the non-terrestrial vehicle 804 within the geographic coverage area 810, and therefore, the geographic coverage area 810 illustrates the wireless cellular coverage provided by the non-terrestrial vehicle 804. The geographic coverage area 810 is identified by a cell ID (e.g., PCI, CGI) labeled "Cell ID 1."

In the example of FIG. 9, a UE 902 (e.g., any of the UEs described herein, such as UE 105 in FIGS. 1-3) is at times within the geographic wireless coverage area 910-1 of a first non-terrestrial vehicle 904-1 (e.g., any of the non-terrestrial vehicles described herein, such as SV 102, 202, or 302) and at times within the geographic coverage area 910-2 of a second non-terrestrial vehicle 904-2. Both the first and second non-terrestrial vehicles 910-1 and 910-2 are illustrated in FIG. 9 as satellites and may collectively be referred to as non-terrestrial vehicles 904. As in FIG. 8, the UE 902 can communicate wirelessly with the non-terrestrial vehicle 904-1 within the geographic coverage area 910-1, and with the non-terrestrial vehicle 904-2 within the geographic coverage area 910-2. The geographic coverage areas 910 illustrate the cellular coverage provided by the non-terrestrial vehicles 904. The geographic coverage area 910-1 is identified by a cell ID (e.g., PCI, CGI) labeled "Cell ID 1" and the geographic coverage area 910-2 is identified by a cell ID labeled "Cell ID 2."

Referring to FIG. 8, the non-terrestrial vehicle 804 may be equipped with a steerable antenna, and therefore, although the non-terrestrial vehicle 804 moves relative to the geographic wireless coverage area 810 between time "t1" and time "t2," the geographic wireless coverage area 810 remains relatively fixed in size and location on the surface of the Earth. Referring to FIG. 9, the non-terrestrial vehicles 904 may or may not be equipped with steerable antennas. Either way, the geographic wireless coverage areas 910-1 and 910-2 (collectively, geographic coverage areas 910) are fixed with reference to the corresponding non-terrestrial vehicle 904. Hence, if a non-terrestrial vehicle 904 moves relative to the surface of the Earth, the corresponding geographic wireless coverage area 910 moves with it.

Due to continuous movement of non-terrestrial vehicles and their comparatively large geographic wireless coverage areas, the cell coverage can change over time and possibly across borders. Whether the geographic wireless coverage area is fixed or moving, cell coverage for a given UE's geo-location can change. For example, in FIG. 8, although the geographic wireless coverage area 810 is "fixed," the shape changes as the non-terrestrial vehicle's 804 location above the geographic wireless coverage area 810 changes from time "t1" to time "t2." Due to this "stretching" of cell coverage, the UE 802 is in the geographic wireless coverage area 810 at time "t1" but not at time "t2." As another example, in FIG. 9, due to the moving cellular coverage of geographic wireless coverage areas 910, the UE 902 is in geographic wireless coverage area 910-1 at time "t1" and in geographic wireless coverage area 910-2 at time "t2."

Certain services may not require an accurate location of a UE, such as routing emergency calls from the UE to a suitable public safety answering point (PSAP). For such services, the core network (e.g., a 5GCN 110) can use the cell ID associated with the UE (e.g., "Cell ID 1" in FIG. 8) to represent the location of the UE. For example, knowing the cell (and therefore the corresponding geographic area) in which the UE is currently attached or registered (i.e., connected for wireless service) is typically sufficient to route an emergency call from the UE to an appropriate PSAP. The core network can use a Cell Global Identifier (CGI) associated with the UE to determine the cell in which the UE is currently attached or registered. The core network can obtain the CGI from the RAN (e.g., NG RAN 112) in which the UE is located.

Figure 10:
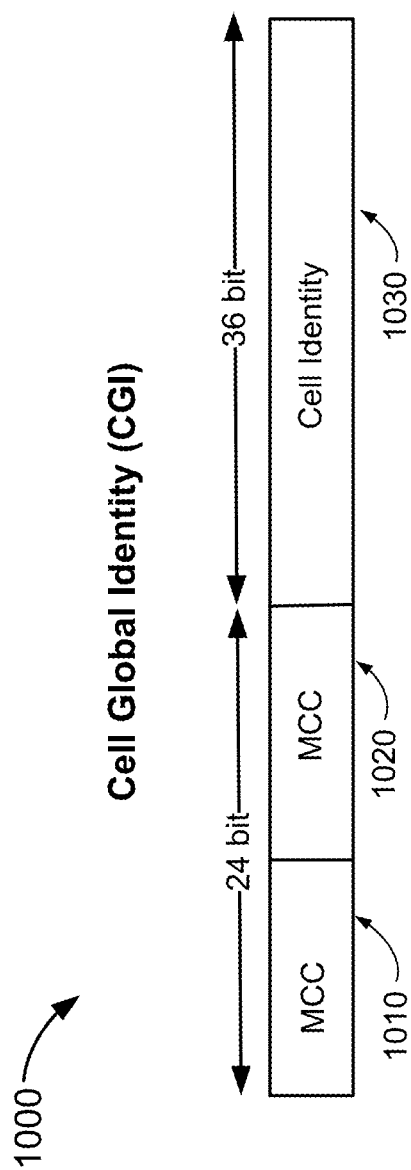
FIG. 10 illustrates the fields of an example cell global identity (CGI).

FIG. 10 illustrates the fields of an example CGI 1000 applicable to 5G New Radio (NR). The CGI 1000 includes a public land mobile network (PLMN) identity, which may be 24 bits in size, composed of a mobile country code (MCC) 1010 and a mobile network code (MNC) 1020. The combination of the MCC 1010 and MNC 1020 can uniquely identify a mobile network operator (carrier), and therefore, can be used as the PLMN identity. The CGI 1000 further includes a 36-bit cell identity 1030 that identifies a cell belonging to the PLMN to which the UE is connected.

As described above with reference to FIGS. 8 and 9, the cell identity may not accurately represent a UE's location in an NTN due to the movement of the non-terrestrial vehicle (s) providing cellular coverage to the UE. For example, as described with reference to FIG. 8, the shape of the geographic wireless coverage area 810 may change, and therefore, the UE 802 may not actually be within the geographic coverage area 810 even though it is associated with that cell ID. As described with reference to FIG. 9, the UE 902 may not move, but the cell ID with which it is associated may change based on the movement of the non-terrestrial vehicles 904. Accordingly, the present disclosure provides techniques to augment the CGI so that it more accurately represents the geographic area in which a UE is located. Such a CGI may be referred to herein as an "augmented" or "enhanced" CGI.

As a first solution, referred to herein as SOLUTION 1, instead of reporting only the CGI associated with a UE to the core network, the RAN can report the CGI and a timestamp. Since the cell associated with the cell identity in the CGI may be moving or changing, the timestamp is added to indicate the last known time the UE accessed the identified cell. The core network can use a mapping function and/or database to convert the enhanced CGI (i.e., CGI-plus-timestamp) to an approximate geographic location for the UE when needed (e.g., for routing an emergency call). More specifically, the mapping could indicate the geographic area of the radio coverage of the cell (e.g., geographic coverage area 810) at the time indicated by the timestamp.

For example, the mapping may indicate that at time "t1" (e.g., time "t1" in FIG. 8), a particular CGI covers a geographic area "A1" (e.g., geographic coverage area 810 at time "t1"), and at time "t2" (e.g., time "t2" in FIG. 8), it covers a different geographic area "A2" (e.g., geographic coverage area 810 at time "t2"). The times "t1" and "t2" may be time ranges, as opposed to discrete time values. The core network could look up the geographic area based on the time range in which the received timestamp would fall.

In an alternative aspect, the RAN may perform the mapping, either upon request from the core network or by configuration. If by request, the core network may send to the RAN the CGI and timestamp and the RAN may provide the associated geographic area. If by configuration, the RAN may simply provide the geographic area to the core network, instead of the CGI and timestamp.

As a second solution described herein, referred to herein as SOLUTION 2, the RAN may replace the CGI (or a portion of the CGI) with beam center coordinates when reporting a UE's cell ID to the core network. In this solution, the radio beam used by a UE to communicate with a non-terrestrial vehicle (or other base station) is used to provide a location related cell ID. The beam center may be provided as (x, y) coordinates and the beam radius may be provided as an uncertainty 'r.' In this way, the UE will be located within a circle having a center at the coordinates (x, y) and a radius of 'r.'

The quantities 'x,' 'y,' and 'r' may be encoded within the cell identity field (e.g., cell identity 1030) of the CGI (making it an enhanced CGI). For example, with a 36-bit cell identity field, 'x' and 'y' could each be encoded using 14 bits and 'r' could be encoded using 8 bits. This number of bits may provide a location precision of about 1.5 kilometers (km), which may suffice for large radio beams (such as provided by non-terrestrial vehicles). Upon receiving an enhanced CGI including a location-encoded cell ID field (which may be referred to as a "beam coordinates field") from the RAN, the core network can locate the UE at the cell level by simply decoding the location indicated in the cell identity field of the CGI. There is no need for an additional cell ID or mapping database.

As a third solution, referred to herein as SOLUTION 3, the RAN may replace the CGI (or a portion of the CGI) with location coordinates of the UE when reporting a UE's cell ID to the core network. In this solution, the RAN or the UE may determine the UE's location using some positioning method. The positioning method may be RAT-independent, such as a GPS or GNSS positioning procedure. The positioning method may also or instead be RAT dependent, and may include: (i) an enhanced cell ID (E-CID) positioning procedure; (ii) a downlink positioning procedure based on measurements by the UE of downlink signals received from SVs 102/202/302, such as measurements of reference signal received power (RSRP), reference signal received quality (RSRQ), receive time-transmission time difference (Rx-Tx), time difference of arrival (TDOA), or angle of arrival (AOA); and/or (iii) an uplink positioning procedure based on measurements by an SV 102/202/302 or sNB 106/307 of uplink signals received from the UE, such as measurements of RSRP, RSRQ, Rx-Tx, TDOA, or AOA. An E-CID positioning procedure is based on radio resource management (RRM) measurements. In E-CID, the UE may report the serving cell ID, a timing advance (TA), and identifiers, estimated timing, and signal strength of detected neighbor cells (if available). A location of the UE is then estimated based on this information and the known locations of the base station(s).

Once determined, the UE's location (x, y) and associated uncertainty (r) are encoded in a CGI (making it an enhanced CGI) as a cell ID similar to the second solution disclosed herein. However, since the UE's location may have a higher precision than the location of a radio cell's coverage area (as in the second solution), more bits may be needed to encode the values of 'x,' 'y,' and 'r.' For example, a location precision of around 100 meters (m) could need 18 bits for each of the values of 'x' and 'y' and 12 bits for the value of 'r.' Since this is larger than the 36-bit size of the cell identity field, an option would be to simply remove the value 'r.' This would then fit in the 36-bit cell identity field. Alternatively, fewer bits could be used for 'x,' 'y,' and 'r,' (e.g., more significant leftmost bits for 'x' and 'y could be removed if a region (e.g., such a county, state or country) in which a UE is located is separately known or separately available). As yet another alternative, the size of a CGI (e.g., the Cell Identity field 1030) could be increased. The field(s) conveying the bits representing the UE's location may be referred to herein as the "UE location coordinates field(s)."

Figure 11:
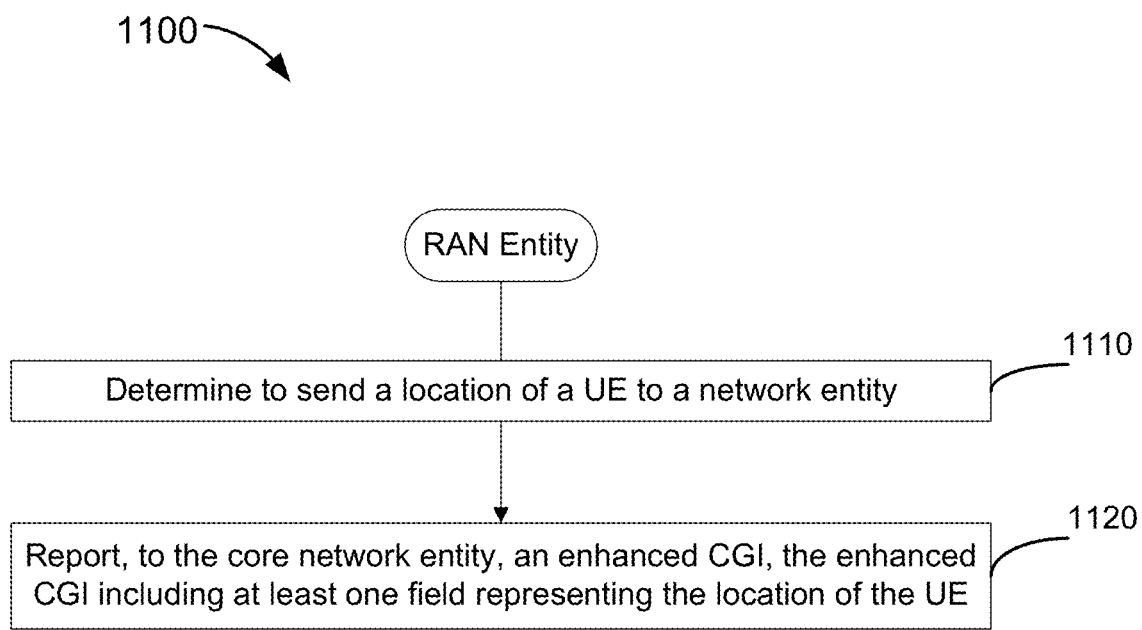
FIGS. 11 and 12 illustrate example methods of wireless communication, according to aspects of the disclosure.

FIG. 11 illustrates an example method 1100 of wireless communication, according to aspects of the disclosure. In an aspect, the method 1100 may be performed by a RAN entity (e.g., a gateway, such as an NTN gateway 104, or a base station such as an sNB 106, sNB 202 or sNB 307, etc.).

At 1110, the RAN entity determines to send a location of a UE (e.g., any of the UEs described herein, such as UE 105 in FIGS. 1-3) to a network entity (e.g., AMF 122, SMF 134, etc.). In an aspect, operation 1110 may be performed by network interface(s) 790, processing system 794, memory component 796, and/or positioning component 798, any or all of which may be considered means for performing this operation.

At 1120, the RAN entity reports, to the network entity, an enhanced CGI, the enhanced CGI including at least one field representing the location of the UE. In an aspect, operation 1120 may be performed by network interface(s) 790, processing system 794, memory component 796, and/or positioning component 798, any or all of which may be considered means for performing this operation. The enhanced CGI may correspond to any of the enhanced CGIs described previously herein for SOLUTION 1, SOLUTION 2, or SOLUTION 3.

Figure 12:
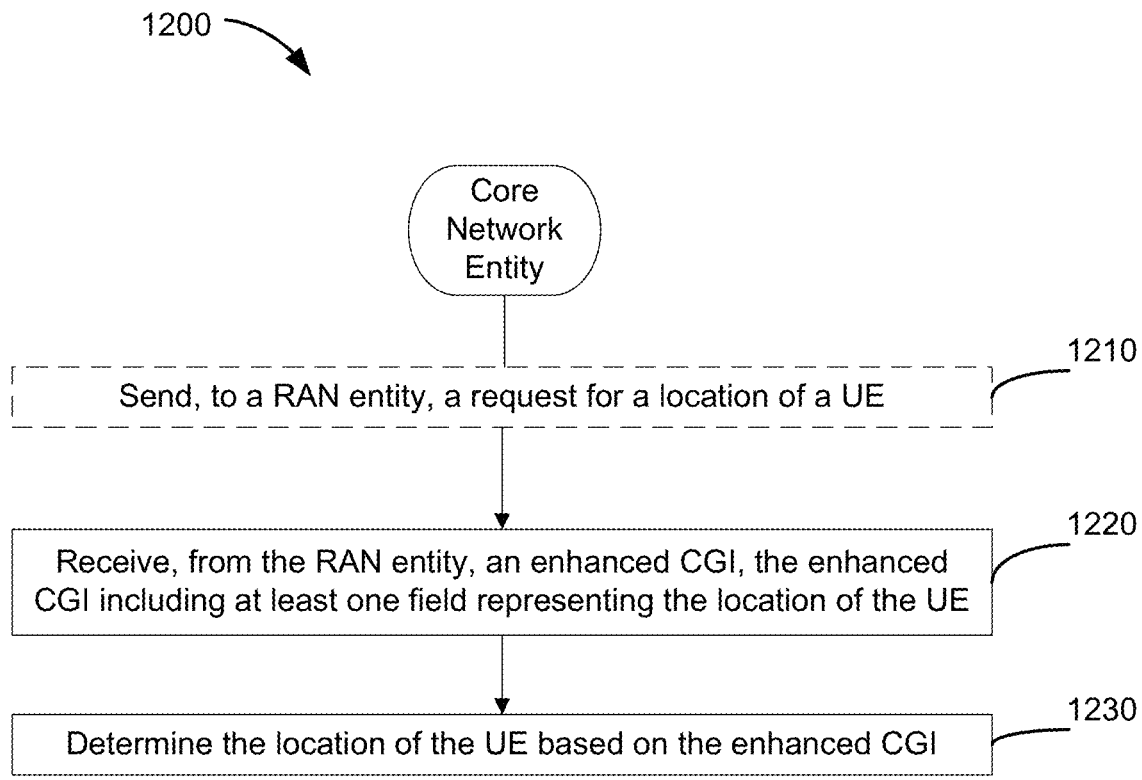

FIG. 12 illustrates an example method 1200 of wireless communication, according to aspects of the disclosure. In an aspect, the method 1200 may be performed by a network entity (e.g., AMF 122, SMF 134, etc.).

At 1210, the network entity optionally sends, to a RAN entity, a request for a location of a UE (e.g., any of the UEs described herein). Operation 1210 is optional because, in some cases, the network entity receives the enhanced CGI from the RAN entity without requesting it. In an aspect, operation 1210 may be performed by network interface(s) 790, processing system 794, memory component 796, and/or positioning component 798, any or all of which may be considered means for performing this operation.

At 1220, the network entity receives, from the RAN entity, an enhanced CGI, the enhanced CGI including at least one field representing the location of the UE. In an aspect, operation 1220 may be performed by network interface(s) 790, processing system 794, memory component 796, and/or positioning component 798, any or all of which may be considered means for performing this operation. The enhanced CGI may correspond to any of the enhanced CGIs described previously herein for SOLUTION 1, SOLUTION 2, or SOLUTION 3.

At 1230, the core network entity determines the location of the UE based on the enhanced CGI. In an aspect, operation 1230 may be performed by network interface(s) 790, processing system 794, memory component 796, and/or positioning component 798, any or all of which may be considered means for performing this operation.

As will be appreciated, a technical advantage of the methods 1100 and 1200 is the provision and use of a cell identity or CGI that more accurately represents a UEs location, especially in NTNs.

In an aspect, a core network (e.g., a 5GCN 110) may use an enhanced CGI with a content defined according to SOLUTION 3 to represent a fixed cell area in which a wireless emergency alert (WEA) message is to be broadcast to UEs 105. For example, a government agency may provide to a 5GCN 110 a WEA message and a geographic definition of a target area in which the WEA message is to be broadcast by the PLMN associated with the 5GCN 110. The geographic definition of the target area may, for example, comprise a polygon defined by latitude and longitude coordinates for its vertices. The 5GCN 110 (e.g., a Cell Broadcast Center Function (CBCF) in 5GCN 110) may then map the target area into one or more enhanced CGIs, where the area covered by the one or more enhanced CGIs is the same as or slightly exceeds the target area. The 5GCN 110 may then provide to one or more sNBs 106/202/307 in an NG-RAN 112 the WEA message and the one or more enhanced CGIs. The NG-RAN 112 (e.g., the one or more sNBs 106/202/307 in NG-RAN 112) may then map each of the enhanced CGIs to one or more radio cells for the NG-RAN 112 and may broadcast the WEA message in these radio cells.

In another aspect, a UE 105 that is establishing an emergency call may include an enhanced CGI in a Session Initiation Protocol (SIP) INVITE message sent to a 5GCN 110 to request establishment of the emergency call. The UE 105 may determine the enhanced CGI by first obtaining a location of the UE 105 (e.g., using GNSS) and may map the location to an enhanced CGI as described above for SOLUTION 3. The 5GCN 110 may use the enhanced CGI (e.g., may use location information for UE 105 in the enhanced CGI) to route the emergency call request (e.g., the SIP INVITE) to or towards a Public Safety Answering Point (PSAP) associated with the location of the UE 105.

Implementation examples are described in the following numbered clauses:

Clause 1. A method of wireless communication performed by a radio access network (RAN) entity, comprising: determining to send a location of a user equipment (UE) to a network entity; and reporting, to the network entity, an enhanced cell global identifier (CGI), the enhanced CGI including at least one field representing the location of the UE.

Clause 2. The method of Clause 1, wherein the enhanced CGI comprises a cell identity field and a timestamp field, the cell identity field indicating a cell to which the UE is attached, the timestamp field indicating a time at which the UE was determined to be attached to the cell.

Clause 3. The method of any of Clauses 1 and 2, wherein the enhanced CGI comprises a beam coordinates field indicating a geographic coverage area of a radio beam providing cellular connectivity to the UE.

Clause 4. The method of Clause 3, wherein the beam coordinates field includes coordinates of a center of the radio beam and optionally a radius of the radio beam.

Clause 5. The method of Clause 3, wherein: the beam coordinates field replaces a cell identity field in the enhanced CGI, or the beam coordinates are mapped to the cell identity field in the enhanced CGI.

Clause 6. The method of any of Clauses 1-5, wherein the enhanced CGI comprises a UE location coordinates field indicating a geographic location of the UE.

Clause 7. The method of Clause 6, wherein the UE location coordinates field includes geographic coordinates for the geographic location of the UE.

Clause 8. The method of any of Clauses 6 and 7, wherein the UE location coordinates field includes an uncertainty value associated with the geographic location of the UE.

Clause 9. The method of any of Clauses 6-8, wherein: the UE location coordinates field replaces a cell identity field in the enhanced CGI, or the UE location coordinates are mapped to the cell identity field in the enhanced CGI.

Clause 10. The method of Clause 9, wherein the UE location coordinates field does not include an uncertainty value associated with the geographic location of the UE.

Clause 11. The method of any of Clauses 1-10, wherein the determining comprises: receiving, from the network entity, a request for the location of the UE.

Clause 12. The method of Clause 11, wherein the determining comprises: receiving an emergency call made by the UE.

Clause 13. The method of any of Clauses 1-12, wherein: the RAN entity comprises a gateway between a non-terrestrial vehicle providing cellular connectivity to the UE and the network entity, or the RAN entity comprises a serving base station for the UE.

Clause 14. A method of wireless communication performed by a network entity, comprising: receiving, from a radio access network (RAN) entity, an enhanced cell global identifier (CGI), the enhanced CGI including at least one field representing a location of a user equipment (UE); and determining the location of the UE based on the enhanced CGI.

Clause 15. The method of Clause 14, wherein the enhanced CGI comprises a cell identity field and a timestamp field, the cell identity field indicating a cell to which the UE is attached, the timestamp field indicating a time at which the UE was determined to be attached to the cell.

Clause 16. The method of any of Clauses 14 and 15, wherein the determining comprises: determining a geographic coverage area of the cell to which the UE is attached based on the timestamp.

Clause 17. The method of Clause 16, wherein the determining the geographic coverage area comprises: retrieving the geographic coverage area from a database, the database storing a plurality of geographic coverage areas associated with the cell, each of the plurality of geographic coverage areas associated with a different position of a non-terrestrial vehicle supporting the cell at a different time.

Clause 18. The method of Clause 16, wherein the determining the geographic coverage area comprises: sending a request to a RAN in which the RAN entity is located, the request including the enhanced CGI; and receiving, in response to the request, the geographic coverage area.

Clause 19. The method of any of Clauses 14-18, wherein the enhanced CGI comprises a beam coordinates field indicating a geographic coverage area of a radio beam providing cellular connectivity to the UE.

Clause 20. The method of Clause 19, wherein the beam coordinates field includes coordinates of a center of the radio beam and optionally a radius of the radio beam.

Clause 21. The method of any of Clauses 19 and 20, wherein the determining comprises: determining the location of the UE as corresponding to the geographic coverage area of the radio beam.

Clause 22. The method of any of Clauses 19-21, wherein: the beam coordinates field replaces a cell identity field in the enhanced CGI, or the beam coordinates are mapped to the cell identity field in the enhanced CGI.

Clause 23. The method of any of Clauses 14-22, wherein the enhanced CGI comprises a UE location coordinates field indicating a geographic location of the UE.

Clause 24. The method of Clause 23, wherein the UE location coordinates field includes geographic coordinates for the geographic location of the UE.

Clause 25. The method of any of Clauses 23 and 24, wherein the UE location coordinates field includes an uncertainty value associated with the geographic location of the UE.

Clause 26. The method of any of Clauses 23-25, wherein: the UE location coordinates field replaces a cell identity field in the enhanced CGI, or the UE location coordinates are mapped to the cell identity field in the enhanced CGI.

Clause 27. The method of Clause 26, wherein the UE location coordinates field does not include an uncertainty value associated with the geographic location of the UE.

Clause 28. The method of any of Clauses 23-27, wherein the determining comprises:
  determining the location of the UE as corresponding to the geographic location of the UE.

Clause 29. The method of any of Clauses 14-28, further comprising: sending, to the RAN entity, a request for the location of the UE.

Clause 30. The method of Clause 29, wherein the request for the location of the UE is associated with an emergency call made by the UE.

Clause 31. The method of any of Clauses 14-30, wherein: the RAN entity comprises a gateway between a non-terrestrial vehicle providing cellular connectivity to the UE and the network entity, or the RAN entity comprises a base station providing cellular connectivity to the UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a radio access network (RAN) entity, comprising:
    determining to send a location of a user equipment (UE) to a network entity; and
    reporting, to the network entity, an enhanced cell global identifier (CGI) to enable the network entity to determine the location of the UE based on the enhanced CGI, the enhanced CGI including a plurality of fields, the plurality of fields including a mobile country code (MCC), a mobile network code (MNC), and a beam coordinates field, wherein the beam coordinates field indicates a geographic coverage area of a radio beam providing cellular connectivity to the UE, wherein the beam coordinates field includes coordinates of a center of the radio beam or the coordinates of the center of the radio beam and a radius of the radio beam, and wherein the RAN entity comprises a gateway between a non-terrestrial vehicle providing cellular connectivity to the UE and the network entity.

2. The method of claim 1, wherein:
    the beam coordinates field replaces a cell identity field in the enhanced CGI, or
    the beam coordinates field is mapped to the cell identity field in the enhanced CGI.

3. The method of claim 1, wherein the determining comprises:
    receiving, from the network entity, a request for the location of the UE.

4. The method of claim 3, further comprising:
    receiving an emergency call made by the UE, wherein the request for the location of the UE is associated with the emergency call made by the UE.

5. A method of wireless communication performed by a radio access network (RAN) entity, comprising:
    determining to send a location of a user equipment (UE) to a network entity; and
    reporting, to the network entity, an enhanced cell global identifier (CGI) to enable the network entity to determine the location of the UE based on the enhanced CGI, the enhanced CGI including a plurality of fields, the plurality of fields including a mobile country code (MCC), a mobile network code (MNC), and a UE location coordinates field, wherein the UE location coordinates field indicates a geographic location of the UE in latitude and longitude coordinates, and wherein the RAN entity comprises a gateway between a non-terrestrial vehicle providing cellular connectivity to the UE and the network entity.

6. The method of claim 5, wherein the UE location coordinates field includes an uncertainty value associated with the geographic location of the UE.

7. The method of claim 5, wherein:
    the UE location coordinates field replaces a cell identity field in the enhanced CGI, or
    the UE location coordinates field is mapped to the cell identity field in the enhanced CGI.

8. A radio access network (RAN) entity, comprising:
    a memory;
    at least one network interface; and
    at least one processor communicatively coupled to the memory and the at least one network interface, the at least one processor configured to:
        determine to send a location of a user equipment (UE) to a network entity; and
        report, to the network entity, an enhanced cell global identifier (CGI) to enable the network entity to determine the location of the UE based on the enhanced CGI, the enhanced CGI including a plurality of fields, the plurality of fields including a mobile country code (MCC), a mobile network code (MNC), and a beam coordinates field, wherein the beam coordinates field indicates a geographic coverage area of a radio beam providing cellular connectivity to the UE, wherein the beam coordinates field includes coordinates of a center of the radio beam or the coordinates of the center of the radio beam and a radius of the radio beam, and wherein the RAN entity comprises a gateway between a non-terrestrial vehicle providing cellular connectivity to the UE and the network entity.

9. A radio access network (RAN) entity, comprising:
    a memory;
    at least one network interface; and
    at least one processor communicatively coupled to the memory and the at least one network interface, the at least one processor configured to:
        determine to send a location of a user equipment (UE) to a network entity; and
        report, via the at least one network interface, to the network entity, an enhanced cell global identifier (CGI) to enable the network entity to determine the location of the UE based on the enhanced CGI, the enhanced CGI including a plurality of fields, the plurality of fields including a mobile country code (MCC), a mobile network code (MNC), and a UE location coordinates field, wherein the UE location coordinates field indicates a geographic location of the UE in latitude and longitude coordinates, and wherein the RAN entity comprises a gateway between a non-terrestrial vehicle providing cellular connectivity to the UE and the network entity.

\* \* \* \* \*